(12) United States Patent
Mech et al.

(10) Patent No.: US 8,300,951 B1
(45) Date of Patent: Oct. 30, 2012

(54) RECOGNIZING SYMMETRIES ALONG PATHS IN VECTOR ART

(75) Inventors: Radomir Mech, Mountain View, CA (US); Yi-Ting Yeh, Hsinchu (TW)

(73) Assignee: Adobe Systems Incorporated, San Jose, CA (US)

( * ) Notice: Subject to any disclaimer, the term of this patent is extended or adjusted under 35 U.S.C. 154(b) by 1006 days.

(21) Appl. No.: 12/324,265

(22) Filed: Nov. 26, 2008

Related U.S. Application Data

(60) Provisional application No. 61/098,611, filed on Sep. 19, 2008.

(51) Int. Cl.
*G06K 9/46* (2006.01)
(52) U.S. Cl. ........................ 382/203; 382/288
(58) Field of Classification Search .......... 382/203, 382/206, 288
See application file for complete search history.

(56) References Cited

U.S. PATENT DOCUMENTS

| | | | | |
|---|---|---|---|---|
| 2004/0247181 | A1* | 12/2004 | Wenzel et al. | 382/206 |
| 2004/0247182 | A1* | 12/2004 | Wenzel | 382/209 |
| 2005/0128197 | A1* | 6/2005 | Thrun et al. | 345/421 |
| 2007/0297681 | A1* | 12/2007 | Wenzel | 382/209 |
| 2008/0021502 | A1* | 1/2008 | Imielinska et al. | 607/1 |
| 2008/0247660 | A1* | 10/2008 | Zhang et al. | 382/254 |
| 2010/0066760 | A1* | 3/2010 | Mitra et al. | 345/629 |

OTHER PUBLICATIONS

Imiya et al. "Symmetry Detection by Random Sampling and Voting Process." Proceedings of the International Conference on Image Analysis and Processing, Sep. 27, 1999, pp. 400-405.*

Simari, P.; Kalogerakis, E.; Singh, K.; "Folding meshes: Hierarchical mesh segmentation based on planar symmetry," Proceedings of the fourth Eurogrpahics symposium on Geometry processing, 2006, pp. 111-119.

Mitra, N. J.; Guibas L.J. Pauly, M., "Partial and approximate symmetry detection for 3d geometry," ACM Transactions on Graphics, 25,3 (2006), pp. 560-568.

Seungkyu Lee; Collins, R.T.; Yanxi Liu, "Rotation symmetry group detection via frequency analysis of frieze-expansions," IEEE Conference on Computer Vision and Pattern Recognition, Jun. 23-28, 2008 pp. 1-8.

Li, M.; Langbein, F. C.; Martin, R. R.; "Detecting Approximate Incomplete Symmetries in Discrete Point Sets," Proceedings of the 2007 ACM symposium on Solid and physical modeling, 2007, pp. 335-340.

Pauly, M.; Mitra, N. J.; Wallner, J.; Pottmann, H.; Guibas, L. J.; "Discovering Structural Regularity in 3D Geometry," ACM SIGGRAPH 2008 papers, Session: Shape Analysis, Article No. 43.

* cited by examiner

*Primary Examiner* — Jon Chang
(74) *Attorney, Agent, or Firm* — Robert C. Kowert; Meyertons, Hood, Kivlin, Kowert & Goetzel, P.C.

(57) ABSTRACT

A method to find symmetries along curved paths in input scenes. The method may detect a curve in an input scene and one or more elements on that curve. The method may define and group points for the one or more element on the curve, and define a centroid for each group. The method may then parameterize a transformation in transformation space between each centroid pair in the input scene. The method may then extract transformation paths by clustering points. The method may create phantom objects in case of mirroring along curved paths to help detect the curved paths.

34 Claims, 20 Drawing Sheets

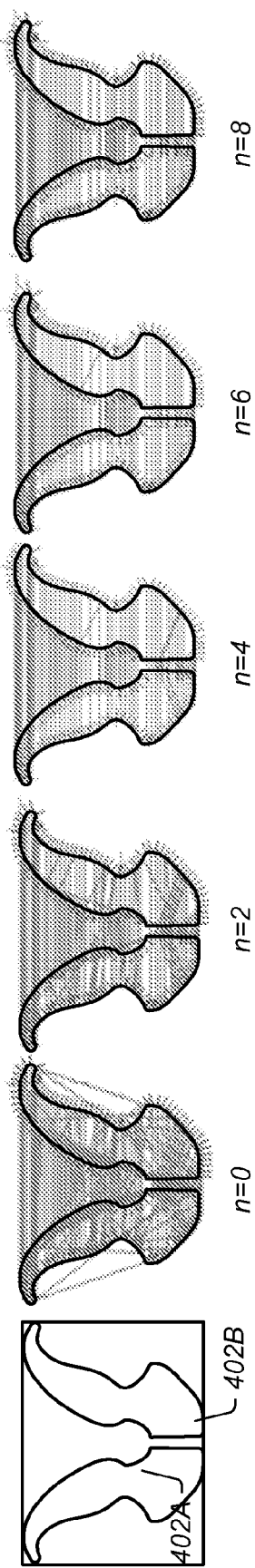
FIG. 4A
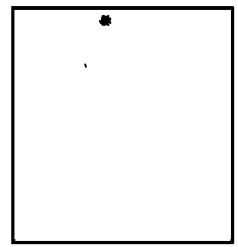
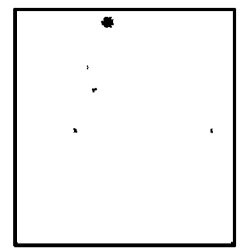
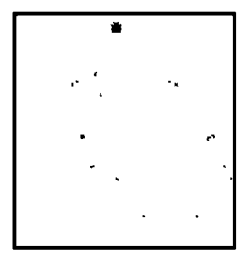
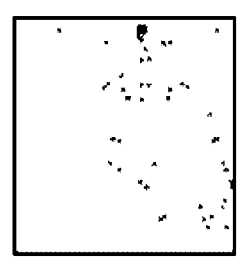
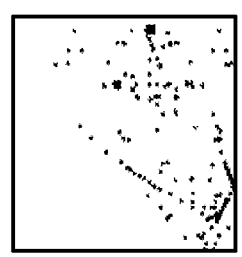
FIG. 4B

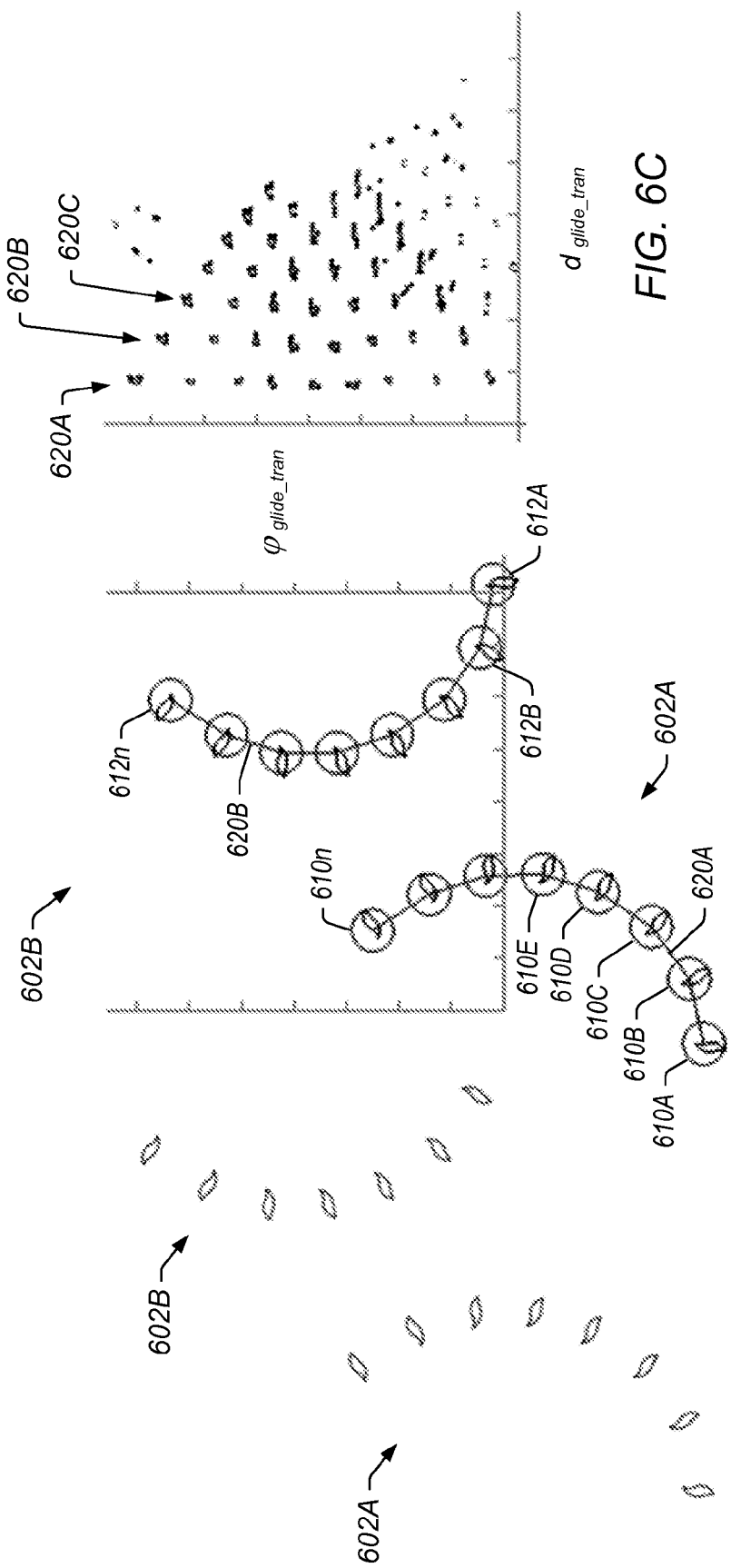

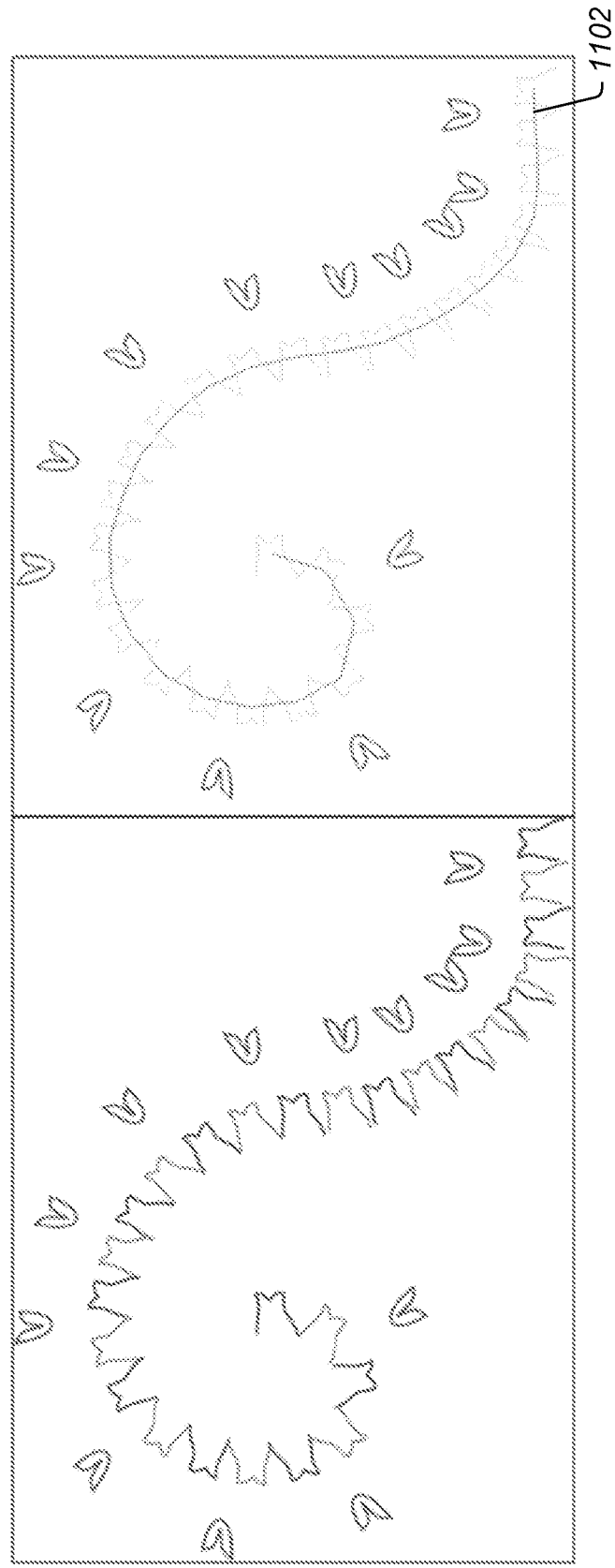

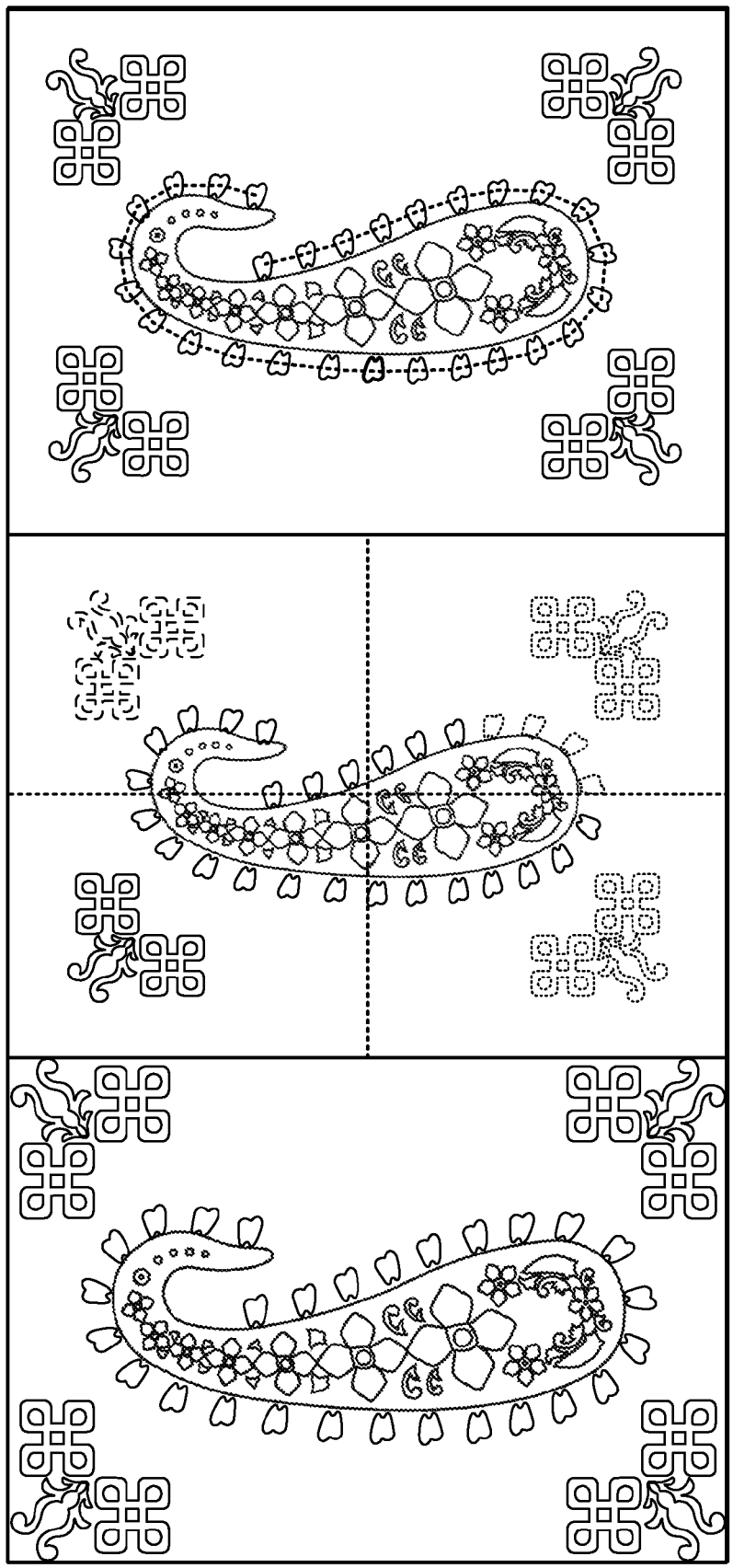

RECOGNIZING SYMMETRIES ALONG PATHS IN VECTOR ART

PRIORITY INFORMATION

This application claims benefit of priority of U.S. Provisional Application Ser. No. 61/098,611 entitled "Recognizing Symmetries Along Paths in Vector Art" filed Sep. 19, 2008, the content of which is incorporated by reference herein in its entirety.

BACKGROUND

Description of the Related Art

Symmetries are ubiquitous in natural and man-made environments. They provide an important perceptive insight for humans to understand the world. They are also essential elements in visual aesthetics. It is important to preserve symmetries for modeling and realistic editing of digital shapes.

A symmetry is considered to be exact if there is a unique transformation T between two sets of points $S_1$ and $S_2$ in Euclidean space such that $T(S_1)$ completely matches $S_2$. The more elements are symmetric with each other using the same transformation T, the more prominent the group of the elements may appear. Even if the transformation T is warped along a curved path, such as a sequence of leaves along a curved plant stem, humans may be able to perceive the regularity of such arrangement. Symmetries along curved paths may be common in decorative patterns where elements undergo rigid transformation locally while their arrangement forms some paths or curved global structures.

The challenge of detecting symmetries of elements along curved paths comes from the fact that we may not have a prior knowledge about the shape, size, and/or location of elements as well as the curved paths, especially since the paths may not be explicitly drawn in the input pattern. Some existing symmetry detection techniques, such as ones that cluster pointwise correspondences in transformation space, may not provide the best solution because the transformation vector may be varying along the path.

In computer graphics, many quantities are naturally defined over the spherical or hemispherical domain, making spherical harmonics a natural basis for these computations. Besides shape details and articulated structures, many digital shapes possess rich global structures which relate different parts of the digital shapes. Representative structures are various symmetries, grid patterns and some shape structures such as line features. Usually, human visual system is sensitive to these global structures.

Symmetry detection has been an active research area in computer vision, computer graphics, architecture, and mathematics. Mathematics behind symmetries has been studied since approximately $19^{th}$ century. Early methods of symmetry detection focused on finding exact symmetries in planar figures. Although they are computationally efficient, their limitation is that they work if the objects under test are free of noise only and imprecisions make them impractical for most cases. To address the challenge that noise and imprecisions usually appear in real-world objects and patterns, many approaches have be proposed to detect approximate symmetries. For example, some solutions proposed a method to compute global symmetries between two point sets. Other techniques defined a continuous measure of distance of a shape, called symmetry distance, to detect symmetries of noisy data. They detect and also recover rotation symmetries with respect to the object centroids.

SUMMARY

Embodiments of a method and apparatus for detecting symmetries in vector art, including symmetries that are warped along curved paths. Vector art may be defined by a set of curves and curve bounded shapes, and it may be used in artistic design. Some of the advantages of vector art over raster images include ease of editing, ease of applying transformations on the primitives, possibility of displaying the art at any resolution without quality degradations, and a compact representation.

The method may detect one or more of the following symmetries: translations, rotations, mirror reflections, scaling, and/or application of translations and mirror reflections along curved paths, among others. The method may be integrated in a design tool, and as such, the detected symmetries can aid artists to perform various pattern editing tasks. The method may automatically extract symmetries without the user intervention, and/or may allow some user input.

Symmetries can provide important clues in understanding many input scenes. For example, symmetry detection can help in efficient editing of a scene. The method may enhance detect symmetries based on clustering in symmetry transformation space. The method may use curvature dependent sample point distribution and neighborhood testing before inserting any point into transformation space. The method may detect elements using the transformation similarity for sequences of sample points. The method may detect symmetries between those elements along an arbitrary curved path by clustering in the distance dimension or the distance divided by element scale dimension.

Once the symmetry paths are detected, the method may unwarp them to facilitate search for more symmetries. The method may allow editing elements symmetric along a curved path, sliding symmetric elements along the path, changing spacing for the symmetric elements, or using a tool that places symmetric elements along a user specified path.

Thus, the method may use neighborhood-matching to reject false symmetries that may have been originally included in the transformation space. The method may distribute sample points on the input curves based on the curvature in order to have fewer points along less curvy segments; this may further reduce the noise in the transformation space. As a result, the method may recognize symmetries along curved paths.

Furthermore, the method may unwarp any symmetry paths to detect secondary symmetries skewed by these paths. The method may introduce various new applications that may assist artists in their tasks, such as creating and/or editing. For example, by extracting the underlying symmetry path, the method may allow artists to slide the group of elements arranged along the path.

BRIEF DESCRIPTION OF THE DRAWINGS

FIGS. 4A-B illustrate the effects of the neighborhood size on the level of noise in the transformation space, according to some embodiments;

FIGS. 6A-C illustrate an example of symmetry along a path and associated transformation space, when centroids of elements are used, according to some embodiments;

FIGS. 11A-D illustrate additional symmetries detected after unwarpping of the symmetry path, according to some embodiments;

FIGS. 12A-C illustrate several reflection symmetries and translation along a path detected in a more complex pattern, according to some embodiments;

Figure 1:
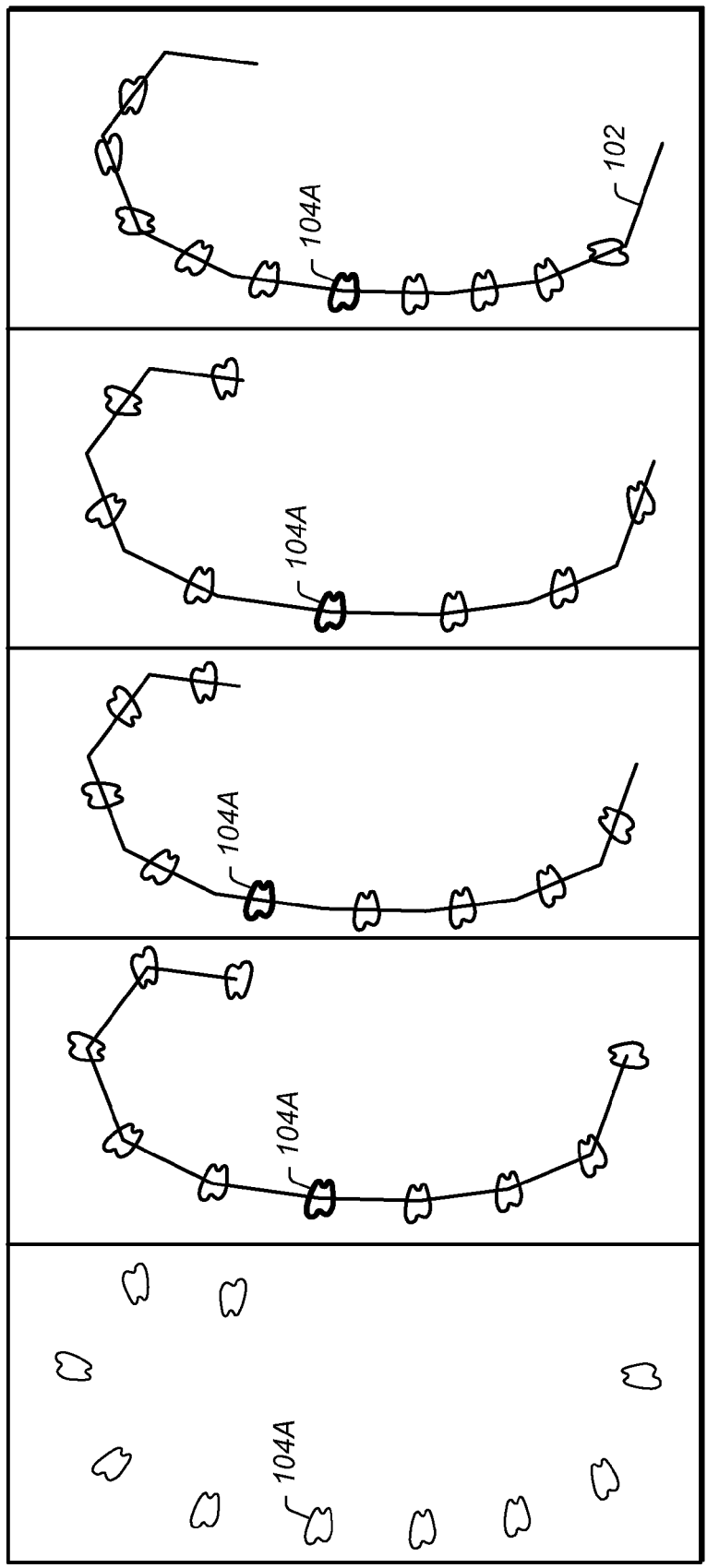
FIGS. 1A-E illustrate a detected translation along a curve allows the user to perform adjustment to element spacing and location; according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and is generally, considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Various embodiments of a method and apparatus for detecting symmetries in vector art, including symmetries that are warped along curved paths are described.

The method may operate to detect one or more of the following symmetries: translations, rotations, mirror reflections, scaling, and/or application of translations and mirror reflections along curved paths, among others. The method may be integrated in a application, such as a design tool. The application can detect symmetries and thus give users tools for easier and better implementation of various pattern editing tasks. Examples of such editing tasks are shown in FIGS. 1A-E, where element symmetry for element 104A on the curved path 102 is detected, and the user can vary the spacing (FIGS. 1B-D) as well as add additional elements along the curved path 102 similar to element 104A (but rotated and/or scaled).

Figure 2:
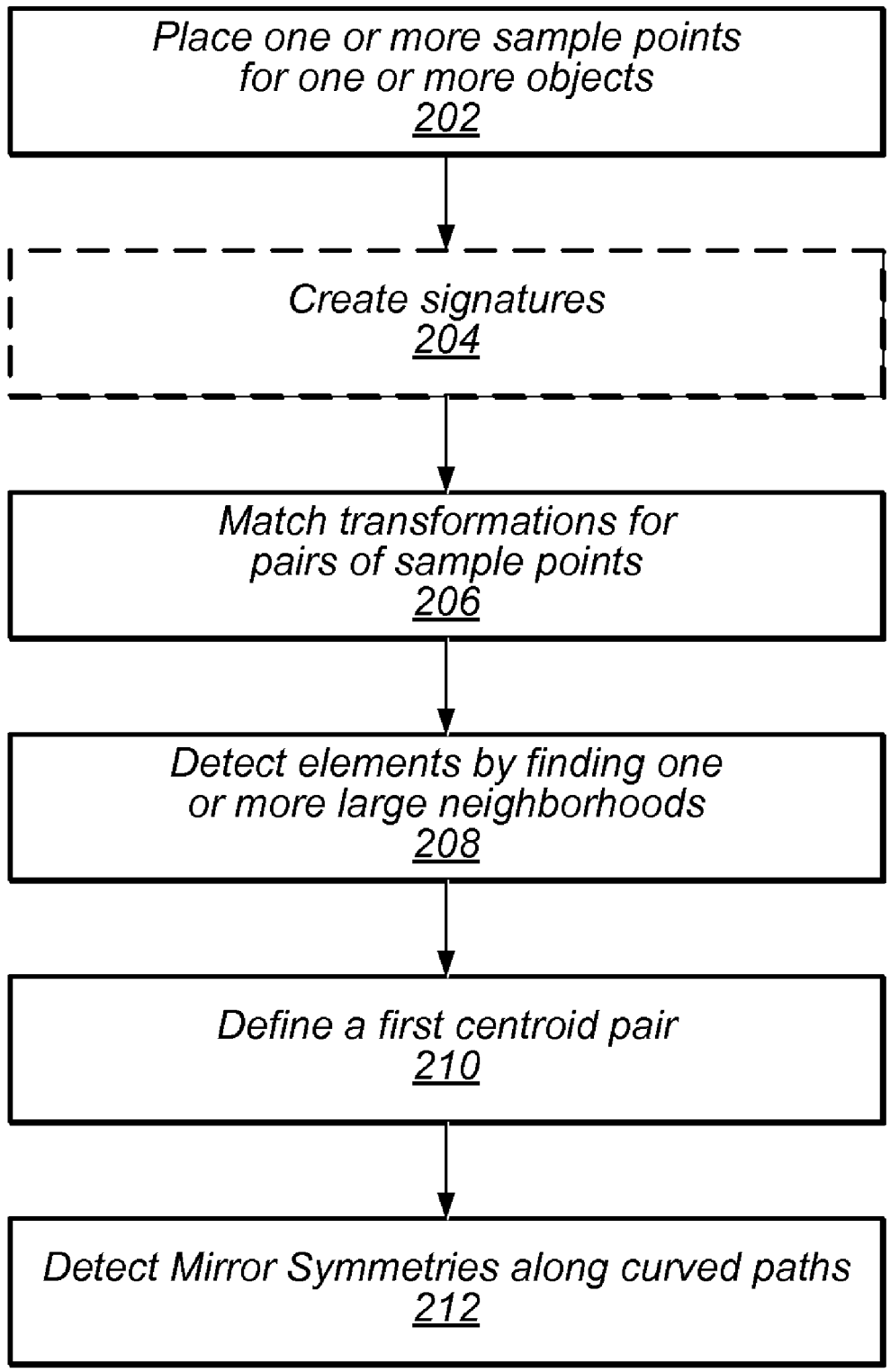
FIG. 2 illustrates a method for detecting symmetries along curved paths in vector art, according to some embodiments.

FIG. 2—Method for Detecting Symmetries Along Curved Paths in Vector Art

FIG. 2 describes a method for detecting symmetries along curved paths in vector art, according to some embodiments. It is noted that additional elements may be present. Furthermore, the elements listed may be executed in a different order, and some elements may not be executed at all. The method may operate on an image, and the image may contain one or more scenes. Each scene in the image may contain a plurality of elements that are distributed along various symmetry types, i.e., some elements may exhibit mirror symmetry with respect to other elements, while being scaled with respect to another set of elements.

In 202, the method may distribute sample points on the input curves based on the curvature in order to have fewer points along less curvy segments; this may further reduce the noise in the transformation space. This is explained in more detail with respect to FIG. 4.

In 204, the method may create signatures for one or more curves in the scene. The signature $s_i$ may be equal to the curvature value that for a parametric curve defined as a function of t, and is described in more detail below.

In 206, the method may detect elements in the scene by finding one or more neighborhoods (i.e., large neighborhoods). This neighborhood matching may be used to reject false symmetries that may have been originally included in the transformation space.

The method may adaptively distribute sample points on the input art, based on the curvature, and test neighborhood sample points before inserting a point into the transformation space. To detect symmetries along a curved path, the method may group points that can be transformed to another group of points and mark them as elements. The method may also create phantom objects between mirror symmetric elements. The method may use centroids of elements or the phantom objects to find symmetries in centroid-specific transformation space. There are various editing operations that may not be possible without the symmetry detection. Thus the method(s) described herein facilitate easy editing of complex patterns with symmetries along curved paths. Furthermore, although the method(s) described herein are given examples in 2D, the embodiments apply similarly to 3D. In addition, the method may operate to use the symmetry graph and topology information to be able to recreate a similar or bigger version of a detected pattern.

To reduce the variance in the transformation space, the method may perform local correspondence tests. In some embodiments, the method may not add a point to the transformation space for a given sample point pair if the neighboring pairs do not satisfy the same transformation. In alternate embodiments, the method may add one or more points to the transformation space for a given sample point pair if the neighboring pairs do not satisfy the same transformation.

In 208, the method may detect elements by finding one or more large neighborhoods in the scene. The method may recognize individual elements that are being transformed. The method may group points on a sequence of continuous curved segments, such as for which there may be transformation to another such group of points in the scene. To detect elements gliding along curved paths, the method may observe that the distance between the elements is approximately constant and/or proportional to the size of the elements.

In 210, the method may define a first centroid pair, and thus a centroid pair for each group delineated above. One or more transformations between pairs of centroids of the same type of elements may be then parameterized in a different transformation space from that of the individual pair of points. The underlying paths of transformations may be extracted by clustering points in the distance dimension of the transformation space of centroids. In the case of mirroring along curved paths, the method may create a list of phantom objects which may be located at the center of reflection of their corresponding mirroring pairs and may use those to detect the paths.

In 212, the method may operate to detect one or more symmetries in the scene along the one or more paths. Thus the method may use a symmetry detection approach in which a transformation between corresponding sample pairs may be first mapped into a transformation space. Then a set of candidate symmetries found through mean-shift clustering may be verified by growing patches that satisfy the corresponding symmetry transformation in the spatial space. In other words, the method may use transformation spaces that represent potential symmetries to find the suitable candidate symmetries, similarly to existing techniques. The method may use a different approach when populating transformation spaces.

In general, there are two classes of approaches to detecting symmetries in 2D images or 3D models. The first type of approach is based on analysis in the frequency domain which uses FFT or autocorrelation to find signal repetition.

The second type is feature-based symmetry detection, which may find distinct features such as edges, corners, among others. These feature points are points that uniquely characterize the images or objects under test. Pseudo-polar Fourier transform may be used to find angular correlation to detect reflectional and rotational symmetries in 2D images. Autocorrelation may be used to detect frieze and wallpaper groups in 2D images, such as by defining regions of dominance to find a correct set of peaks. Absolute values of the peak heights of the signals may be used to detect frieze and wallpaper groups in 2D images as well. A discrete Fourier transform frieze detection method may be applied to rotation symmetry detection by mapping a 2D rotation symmetry problem (e.g., to a frieze detection problem using frieze expansion and/or to identify different rotation symmetry groups.)

It is also possible to perform pair-wise matching of feature points generated by SIFT in images. Another way to detect symmetry may include finding complete and incomplete isometric cycles that induce approximate symmetries in the set of feature points. These incomplete cycles nay be merged, such as if they are induced by the same isometry. Alternatively, a planar reflective symmetry transform (PRST) may be used as a continuous shape descriptor of the reflectional symmetry distance with respect to every plane reflection. The PRST calculation may be accelerated by applying Monte Carlo integration (or another similar technique) to perform sampling of the PRST of 3D surfaces. A shape descriptor using center of mass may also be useful for detecting symmetries.

Because feature-based symmetry detection may find correspondence by matching feature points or feature clusters, it may be able to detect small regions of repeated patterns within a larger image. However, frequency-based symmetry detection may be limited by a frequently used assumption that there exists a single repeated pattern across the whole image. On the whole, the frequency-based symmetry detection may be better for artistic patterns which usually have features not occupying the whole image.

Instead of only looking at the set of representative points, frequency-based symmetry detection may compute candidate symmetry actions of pairs of points that match in their local shape descriptor. In the transformation space, the most probable symmetries may be extracted by using mean-shift clustering. Finally, these candidate symmetries may be verified by checking the spatial consistency while false symmetries are rejected.

In order to discover the underlying structures that describe the rules of how elements are arranged in patterns or object models, some methods may use a grid fitting method in the transformation space for detecting regular structures of point- or mesh-based models. Periodic reliefs may be segmented by refining user-specified candidates of boundaries on the model using iterative closest point (ICP) algorithm. Mirror symmetries may be detected and used to construct a folding tree data structure which may be useful for mesh compression and repair.

In some embodiments, the method may find elements that are repeated along a regular grid or rotation as in grid fitting method, as well as find elements along curved paths. Instead of looking for a grid in a noisy transformation space, the method may cluster points in the distance dimension of a less noisy transformation space of centroids.

The method may take a vector-art pattern as an input and detect symmetries that may appear in the pattern. Thus the method may operate to extract symmetries along curved paths as well as the Euclidean symmetries of reflection, rotation, translations, scaling, their combination, and/or any other symmetry.

Figure 3A:
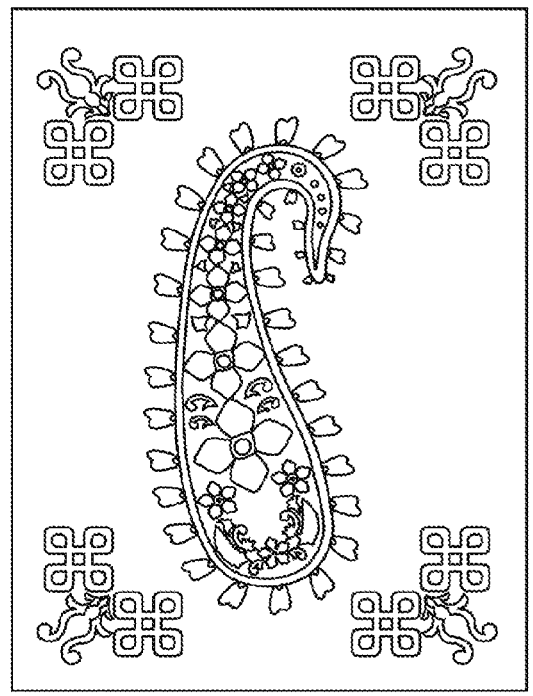
FIGS. 3A-E illustrate a decorative pattern with various symmetries, according to some embodiments.
Figure 3B:
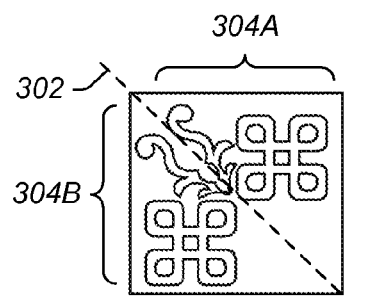
Figure 3C:
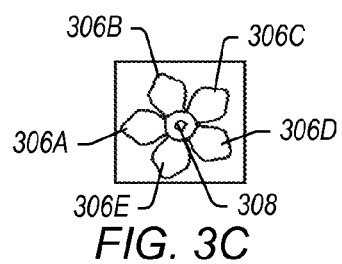
Figure 3D:
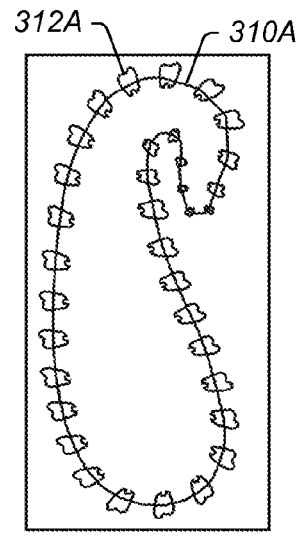
Figure 3E:
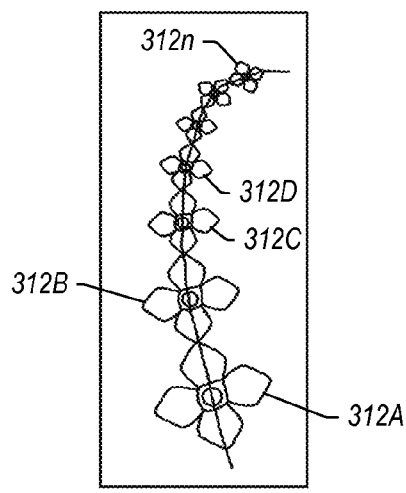

FIG. 3A illustrates various examples of symmetries (shown separately in FIGS. 3B-3E) that may be detected in a given vector-art pattern. It is noted that this list is not exhaustive and other symmetries can easily be detected as well. Specifically, FIG. 3B illustrates reflection symmetry, where element 304A is reflected onto an element 304B (such as around an axis 302). FIG. 3C illustrates rotational symmetry (i.e., elements 306A-E rotated around a center element 308). FIG. 3D illustrates translation symmetry for the multiple tooth-like elements (e.g., elements 312A) along a curved path 310A. FIG. 3E illustrates scaling symmetry of elements 312A, 312B, 312B, 312C . . . 312n, along a curved path 310B.

Given an input pattern, the method may sample points along all primitive's curves, and for each sample point, compute its corresponding normal vector and/or a signature based on curvature near the sample point. The method may also compute a transformation for each pair of corresponding points (e.g., points p and q). The transformation may be defined by a scale s between the signatures (e.g., signatures), the rotation angle θ between the normals (e.g., the angle) and the distance d and the angle φ of the translation needed to move point p to point q, after the point p has been rotated around the origin by the angle θ.

Valid transformations between each pair of points may be then mapped into the transformation space (d). In some embodiments, if the method considers scaling, there may be a valid transformation T=(d, θ, φ, s) for almost any pair, unless the curvature of one point is zero and of the other one is not zero. The method may examine the neighbors to see if their transformation is very close. In some embodiments, if the transformation of the neighbors is not close, the method may not consider T to be a valid transformation. In some embodiments, the method may apply one or more correction factors to the neighbor.

In some embodiments, the method may keep four separate transformation spaces, one for each symmetry type. In case the scale s is close to 1, the method may test for a potential reflectional symmetry, where the angles between the normal vectors and the reflectional axis are the same, or a potential translational symmetry, where their normal vectors have the same orientation. If that is the case, the method may add a point to the transformation space for reflectional or translational symmetry, respectively. If the scale value is close to 1 but the angle θ is not zero, the method may add a point to the transformation space for rotational symmetry. Otherwise the method may add point to the scaling transformation space.

In some embodiments, the method may keep only a subset of the four separate transformation spaces described above. In some embodiments, the method may use other transformation spaces in addition to, or instead of, the ones listed above.

In some embodiments, the method may perform a clustering process to find most, or all, possible symmetries. A cluster of data in the transformation space may indicate that there is a high probability that a symmetry defined by the cluster appears in a spatial domain. This calculation may involve examining most or all the neighborhood to remove unnecessary points from the transformation space. Furthermore, the method may place the sample points based on the local curvature to reduce the noise in the transformation space.

However, in addition to large scale reflection, translation, rotation, or scaling, many decorative patterns may contain elements gliding along curved paths or mirroring along curved paths. For example, flowers or leaves that grow along curved stems to generate natural looking floral decorative patterns or elements used to decorate curved boundaries of objects (as shown in FIGS. 3A-E) may contain elements gliding along curved paths or mirroring along curved paths in addition to the above described symmetries.

In some embodiments, the method may detect symmetries along curved paths and verify that these types of symmetries do not form big clusters in the transformation space. For example, each pair of mirror symmetries in FIG. 8 may have a different reflectional axis, and thus each pair may form one or more clusters in the transformation space. The one or more clusters may be small and/or separate from each other. In addition, the method may not make any assumption about whether the one or more curved path are present (or not) since both cases may be common in real patterns.

A detection of one or more sequences of translations by detecting a regular grid in the transformation space may not be sufficient if patterns created by transformations of objects along curved paths are not regular (such as described with reference to element 210 of FIG. 2). Thus the method may group one or more larger possible set of points with respect to a rigid transformation as an element. The centroid of each element may be assigned a weight which equals the size of the element. In some embodiments, the weight may use a different assignment, such as some function of the size of the element, and/or some other characteristic of the element (such as value, composition, among others). Each centroid may also have one or more signatures, i.e., that indicate the maximum and the minimum signatures of sample points in that element. The method may perform transformation analysis between pairs of centroids and fill a centroid-specific transformation spaces. The method may detect transformations with the same distance component (or the same ratio of the distance and scale components) and may use the associated the centroid locations to extract the underlying symmetry path.

After detecting symmetries along paths, the method may further unwarp the space around the detected paths to find one or more additional symmetries. For example, FIGS. 11A-D show a pattern where the sequence of elements arranged along the paths has embedded mirroring symmetries within the sequence. After the symmetries are detected, the method can use the information for various editing purposes. For example, an editing mode may be implemented that allows a user to scale elements associated with a certain symmetry along a path, or to slide the elements along the detected path. The method may also allow a user to use a tool for brushing the elements along a specified path.

Placing Sample Points

As described above with reference to FIG. 2, the method may operate to place sample points on input curves. If the points are not placed properly, some errors may arise. For example, if sample points on two symmetric shapes are not placed in similar positions in high curvature areas, the values in the transformation space may be skewed and noisy. On the other hand, if there are too many sample points along the curve, the method may be too slow for the user. To address this problem, the method may initially distribute finely spaced sample points along the curves, but when placing points into the transformation space, the method may skip points in areas with low curvature.

For example, sample points $x_i$ may be placed at a distance $d_s$ from each other. The method may set $d_s$ to be approximately 1/100 of the scene size. Once the one or more seed points $x_i$ are determined, the method may compute a normal and a signature for each of them.

Signatures

Normal Vector

In some embodiments, for each sample point on the pattern, the method may operate to estimate its corresponding normal vector by locally fitting lines to the curves. The method may set $N(x_i)$ to be the neighborhood of k points to the left and k points to the right of the point $x_i$. The method may use k of 5. The value of $N(x_i)$ can be easily obtained since all the curves may be represented as a sequence of parametric Bezier curves. The normal vector may be computed by solving the unit eigenvector associated with the smallest eigenvalue of the covariance matrix CV of N($x_i$). In some embodiments, CV may be defined as:

$$CV = \sum_{y \in N(x_i)} (y - o_i) \otimes (y - o_i) \qquad (1)$$

where $\otimes$ denotes the outer product vector operator and $o_i$ denotes the centroid of N($x_i$).

Signature:

The signature $s_j$ (such as described with reference to element 204 of FIG. 2) may be equal to the curvature value that for a parametric curve defined as a function of t can be computed as the following:

$$s_i = \frac{x'(t_i)y''(t_i) - x''(t_i)y'(t_i)}{(x'(t)^2 + y'(t)^2)^{3/2}} \qquad (2)$$

where $t_i$ is such that $x_i = (x(t_i), y(y_i))$. The method may use two sample points, $x_i$ and $x_j$, that match each other in their signatures if $|s_i - s_j| < \epsilon$. The method may use a one-dimensional binary tree to speed up searches of points with similar signatures. Since straight line-segments may not define a unique transformation, the method may set the LineFlag of sampling points with zero curvature to true in the sampling stage. These sampling points may be discarded during the correspondence pairing stage.

Matching Sample Points

Adding a point to the transformation space for each pair of ample points may result in very dense and noisy data. In addition, invalid points in the transformation space may cause false results in the clustering stage. Thus the method may reject one or more points that do not correspond to meaningful symmetries. The threshold for points being in meaningful symmetries may be set automatically per image, or it may be suggested by the method and adjusted by the user, or it may be completely user adjustable.

To avoid having to match many pairs of sample points, the method may take advantage of the fact that the samples are placed on continuous curves. Thus the method may be matching pairs of point neighborhoods and not just pairs of points. In addition, in some embodiments, the method may skip sample points in areas of low curvature, as described below.

Skipping Sample Points

In some embodiments, while matching sample points, the method may skip sample points in areas of low curvature. The method may pick a part of the input art represented by a sequence of curves that are continuous. The method may perform calculations for most or all the sample points $x_i$ on the curves. At most or all of the sample points, the method may generate a random value $r_i$. If the random value $r_i$ is above the curvature $k_i$ associated with the point $x_i$ (and normalized to be in (0, 1)) the method may skip that corresponding point $x_i$, unless last n points (such as n=10) have not been also skipped. In some embodiments, the method may skip the corresponding point if the random value $r_i$ is above the curvature $k_i$ regardless if n last points have been skipped or not. In some embodiments, the corresponding point may not be skipped regardless of whether the random value $r_i$ is above the curvature $k_i$.

FIG. 4 illustrates the effects of varying the value of n (i.e., that controls skipping of a corresponding $x_i$ as described above). The diagrams in the bottom row (i.e., in 4A) represent the scene, and the diagrams in the top row (i.e., in 4B) represent a respective corresponding transformation space for analysis of each scene using a different value of n.

Thus the top row (4A) shows the transformation space and the bottom row shows object space (4B) for the respective transformation. For each line (a candidate reflection symmetry) in the object space 4A there is a dot (angle with axis x and distance from origin (0, 0)) in the transformation space 4B. Normally, the less noise, the better chance the method can detect the symmetries present in the image. In some embodiments, if the method doesn't examine the neighbors (or checks only a small number of neighbors), the method may determine that there are many potential reflection symmetries (as indicated by the lines in the bottom row 4B). In other words, if a small part of the shape (such as 402A) curves at 45 degrees on the bottom right of the shape (402A), then that part may be symmetric with a small part of the shape on the top left, that also slopes at 45 degrees. But that symmetry may only hold locally, as a more proper check of the neighbors to the left and right may indicate that it is not a valid symmetry that would act on a big part of the object or scene.

Thus for n=0, there is much noise in the transformation domain (as seen in a corresponding diagram in 4B above the n=0 diagram in 4A). Figures for n=2, 4, 6, and 8 show how noise in the transformation domain is attenuated for each increase in n. Thus for n=8, there is almost no noise (such as from false matching as discussed below) in the transformation domain. Furthermore, the lines between each pair of elements (i.e., 402A and 402B) in the scene space illustrate matched symmetries. For each increase in n, there is a visible better match between elements 402A and 402B.

Checking Neighborhood

In some embodiments, while matching sample points, the method may search a point with a matching signature for the points that are not skipped. For those points $p_i$ and $p_j$, whose signature match, the method may compute the transformation $T_{ij}$. The method may check if most or all points in the neighborhood $p_i$ and $p_j$ can be transformed using the transformation $T_{ij}$. If they can be transformed then the method may add a point to a transformation space for mirror, translational, or rotational symmetry, based on the normal vector. The method may account for additional symmetries as well.

In some embodiments, the method may not require an exact match when testing the transformation $T_u$ in the neighborhood of $p_i$ and $q_j$, although the degree of matching may be automatically determined and/or supplied by the user. The method may define a distance metric of a transformation $T_u$ as:

$$\text{dist}(p,q,T_{ij}) = \|T_{ij}(p),q\| \qquad (3)$$

The method may accept those neighboring points $p_{i+k}$ and $q_{j+k}$, for which $\text{dist}(p_{i+k}, q_{j+k}, T_{ij}) < d_\epsilon$. The method may define $d_\epsilon$ as the distance tolerance of a candidate transformation. For example, as FIGS. 4A-B show, by increasing the size of the examining neighborhood, the method can reject most false matching.

Scaling

In some embodiments, the method may consider scaling while matching sample points. The method may determine a scaling parameter s based on the ratio of signatures. For example, if the method scales an object up by s, then the curvature may be scaled by 1/s. In this case, the method may also compare the neighborhood of size n. In some embodiments, for this scenario, the method may also compute one or more new sample points on the second curve, since the n points may not need to be placed at distance $d_s$ from each other as on the first curve, but at the distance $d_s s$ instead. If the points in the neighborhood satisfy equation (3) above, using $d_\epsilon s$, then the method may add a point to the scaling transformation space. After most or all valid symmetries are added to the transformations spaces, the method may use k-means clustering to detect them.

Figure 5:
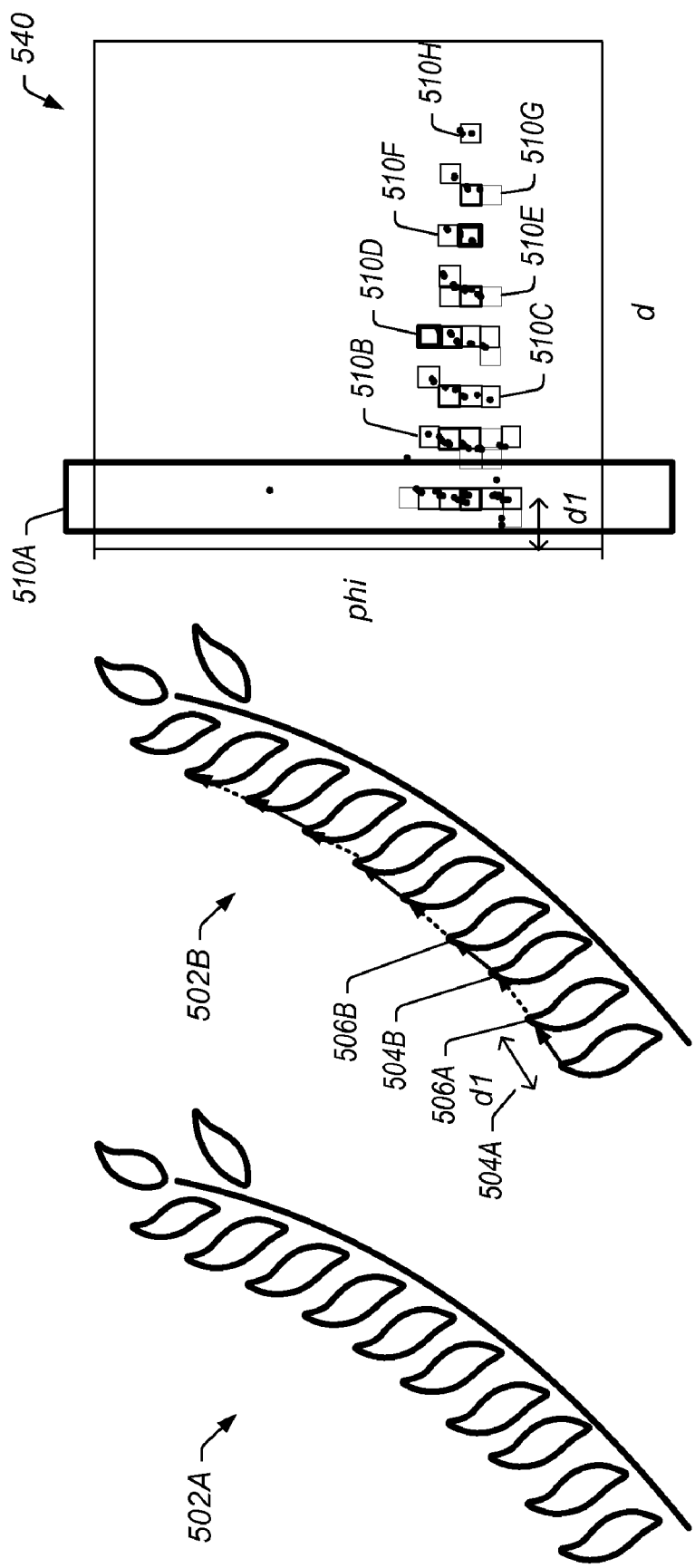
FIG. 5 illustrates an example of symmetry along a curve and associated transformation space, when most or all sample points are considered.

FIG. 5—Detecting Symmetries Along Curved Paths

In many patterns elements may be placed along curved paths. Humans usually can easily identify them due to the regular spacing or spacing proportional to the uniformly changing size of the elements. The method may also be operable to view those cases as symmetries (translation or translation and scaling) applied along a path.

In some embodiments, the method may detect such symmetries by parameterizing the translational vector between pairs of points by distance and angle. For example, FIG. 5 illustrates a transformation space after such clustering. In this example, the method may analyze symmetry between elements 504A and 506A, and then 504B and 506B, and so on. The results are graphed in parameter space 540 according to distance (d) and angle (phi). With reference to FIG. 5, the dots in the first column 510 A show the transformation between pairs of points that correspond to adjacent elements (i.e., 504A and 506A). The method may use the information between adjacent elements to generate isomaps and/or extract the symmetry path.

However, in many cases, the elements may not be purely translated along the path. Instead, the elements may be often rotated in order to be aligned with the path's normal. In this case point-wise translational distance may not be constant any more. However, a transformation between two repeated elements may be viewed as a rigid body motion. Therefore, the method may find individual elements by grouping continuous sequences of sampling points that can be mapped to another sequence of points using the same transformation. As a result, the centroid of each patch may represent each element. The method may then use these centroids to extract the underlying symmetry paths. In some embodiments, the method may also use the inter-centroid distance for each centroid to extract the underlying symmetry paths.

Defining Elements

For one or more pairs of sample points $p_i$ and $q_j$ with transformation $T_{ij}$, the method may find the corresponding element pair that contains $p_i$ and $q_j$, respectively. The method may grow the largest connected neighborhood $N_e(p_i)$ and $N_e(q_j)$, such that $dist(p_{i+k}, q_{j+k}, T_{ij}) < d_\epsilon$ for all $p_{i+k} \in N_e(p_i)$, $q_{j+k} \in N_e(q_j)$. To define a valid element, the method may require at least one third of sample points of a continuous sequence of input curves to match with another element.

Centroids

In some embodiments, for each valid element E, the method may define the centroid C as $$C = \frac{1}{TotalLength} \sum_{v_i \in E} (w_i p_i) \quad (4)$$

where $w_i$ may be weighted by the corresponding length defined by point The signature of a centroid may be a pair of minimum and maximum signature of sample points in the element, and the normal may be the sum of all normals computed at the sample points.

FIGS. 6A-C—Clustering

The method may operate to pair detect centroids and use their respective signatures and normal to insert points to centroid-specific transformation space. In some embodiments, the method may cluster only in one dimension, such as in the distance dimension, to detect elements at a regular distance from each other. In some embodiments, the method may cluster in two or more dimensions.

With respect to FIGS. 6A-6C, FIG. 6A illustrates an input scene with a first and second curve 602A-B. FIG. 6B shows centroids 610A, B, ... n for the first curve 602A, and centroids 612A, B, ... n for the second curve 602B. Furthermore, as shown with reference to FIG. 6, the method may detect a first symmetry path 620A for the first curve 602A, and a second symmetry path 620B for the second curve 602B.

In some embodiments, before extracting the underlying symmetry paths, the method may remove one or more redundant transformation clusters in the transformation space. For example, FIG. 6C shows transformation space both for angle and distance, and it shows that there are no strong clusters since angle changes along the curve (i.e., the relationship between angle phi and distance d for each column 620A, B, C). Once the method collapses the angle dimension and cluster only in d, there may be clear clusters at d, d2, d3, etc. In other words, transformation T1 may be associated with translation by d (first column 620A), translation T2 may be associated with second column 620B. As mentioned above, the second column 620B may be removed after detecting the first cluster of points at distance d (after collapsing into one dimension).

As can be seen in FIG. 6C, transformations embedded in a sequence of translated elements may include translation vectors with lengths equal to multiples of d (e.g., d, 2d, 3d, etc). The method may only use translational vectors that form the basis of all possible transformations. As mentioned above, since translation T2 (column 620B) may be a linear combination of two T1s (column 620A), the method may remove T2 620B from the set of candidate clusters.

FIGS. 7A-D—Connecting Centroids

In some embodiments, after removing redundant clusters, the method may connect elements that fall in the same cluster of distances d. In other embodiments, the method may connect elements that fall in the same cluster of distances d before all or even any redundant clusters are removed.

Figure 7A:
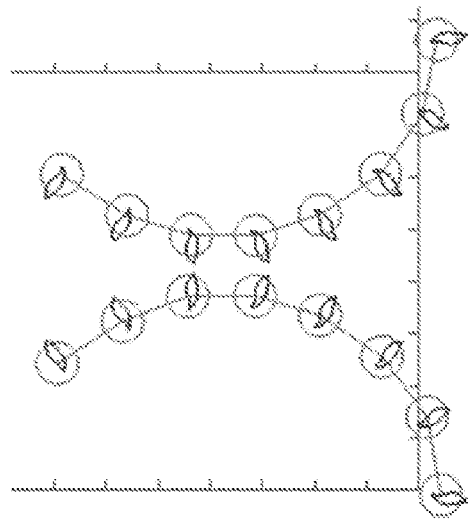
FIGS. 7A-D illustrate a process of connecting centroids to form the symmetry path, according to some embodiments.
Figure 7B:
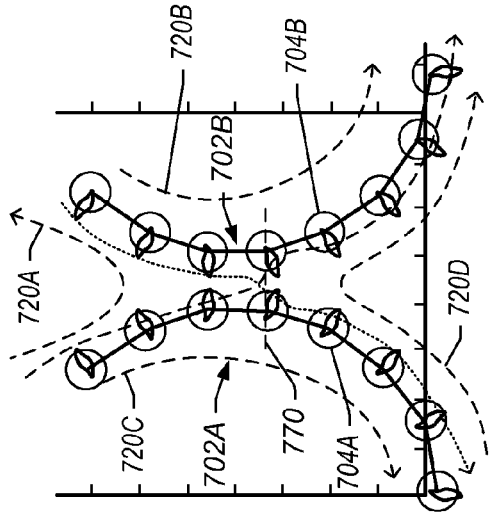

The method may start with any element (such as element 702A of FIG. 7A of an input scene) and define a symmetry path that may be formed by connection with a nearby element at the distance d. The method may then continue with a next element. In the case where two paths are adjacent to each other with a distance similar to the inter-centroid distance d, the method may use a heuristic approach to choose a path that has smoother transitional angles. In some embodiments, the method may use a different approach and/or qualifying criteria to choosing paths. FIG. 7B illustrates detected elements with centroids and detected curves.

Figure 7C:
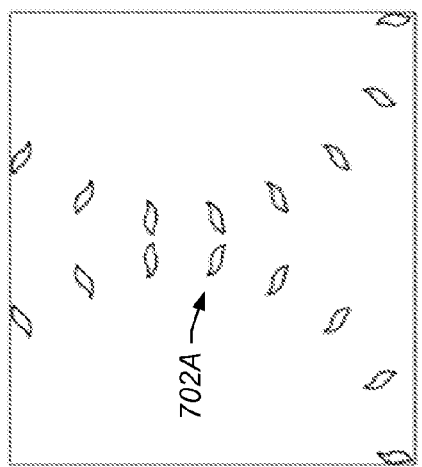
Figure 7D:
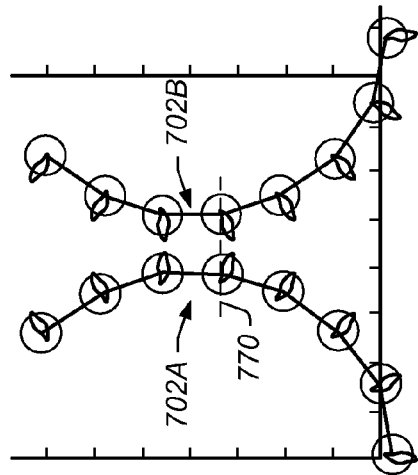

For example, in FIGS. 7C and 7D the distance between any pair of elements may be similar to the elements between elements 702A and 702B, and/or between elements 704A and 704B. Connecting elements with similar spacing distance may result in redundant and unnatural paths. Thus the redundant paths may be removed, such as redundant paths 720A and/or 720D, or paths 720B and/or C.

Figures 8A, 8B:
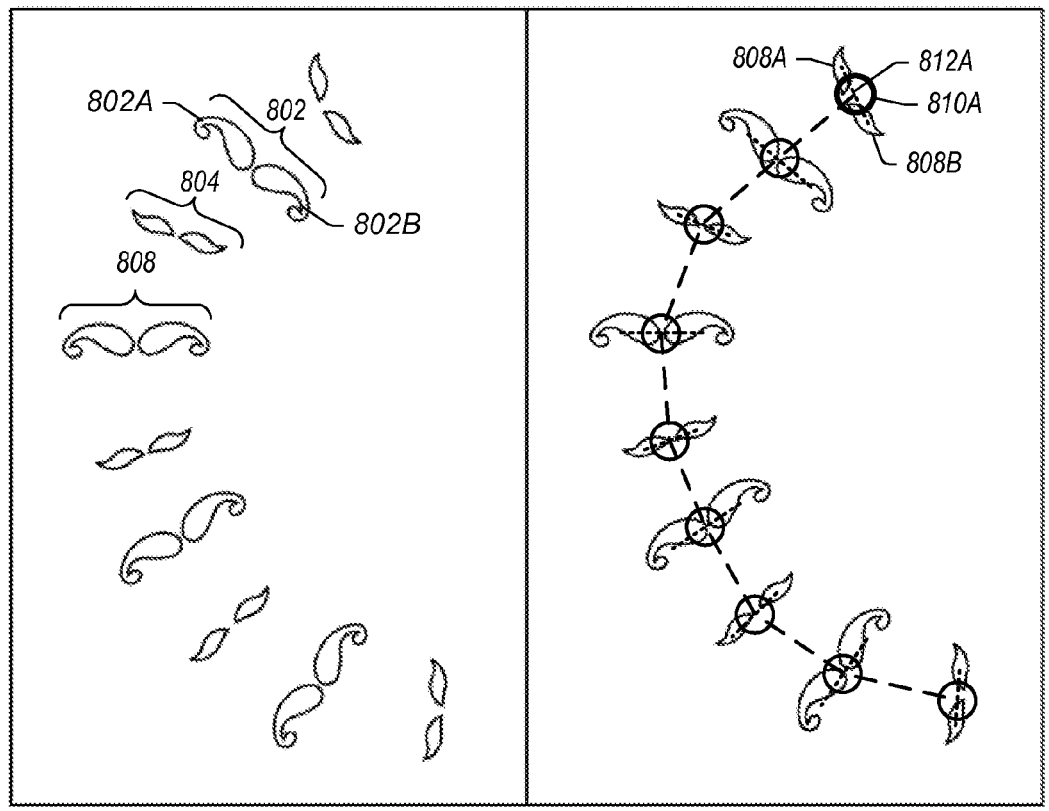
FIGS. 8A-B illustrate elements reflected along a path, according to some embodiments.

FIGS. 8A-B—Detecting Mirror Symmetries Along Curved Paths

If the elements placed along a path are reflected along the path as well, their centroids can be further away from each other outside at one side and closer to each other at the other side of areas with higher curvature (see FIGS. 8A-B). If the method detects elements $E_A$ 802A and $E_B$ 802B (that may be reflected), the method may introduce one or more phantom objects 810A placed at the midpoint between the element's centroids, $e_A$ 808A and $e_B$ 808B.

Further with regard to FIGS. 8A-B, each phantom object 810A may also be assigned an additional width parameter 812A, which may indicates the distance between eA 810A and eB 810B. The method may thus use the width parameter 821A as a signature of the phantom object 810A that can determine the scaling part of the potential symmetry transformation.

Detecting Scaling Along Curved Paths

As mentioned above, the method may include scaling of elements in symmetry detection. Specifically, the method may use parameters of the elements, such as the size of the elements, including the length of the curve representing the element and/or the width parameter of phantom objects, to determine the scale factor s between a pair of elements and/or or phantom objects.

In this scaling detection, there may be two or more cases. A first case may occur when the distance between scaled elements or phantom objects is substantially the same. In this first case, the method may operate to use the same technique of clustering in the distance dimension as described above with reference to Section "Detecting Symmetries Along Curved Paths." Thus when connecting the centroids to form the symmetry path, the method may operate to connect those pairs than have the same scale factor s.

Figure 9A:
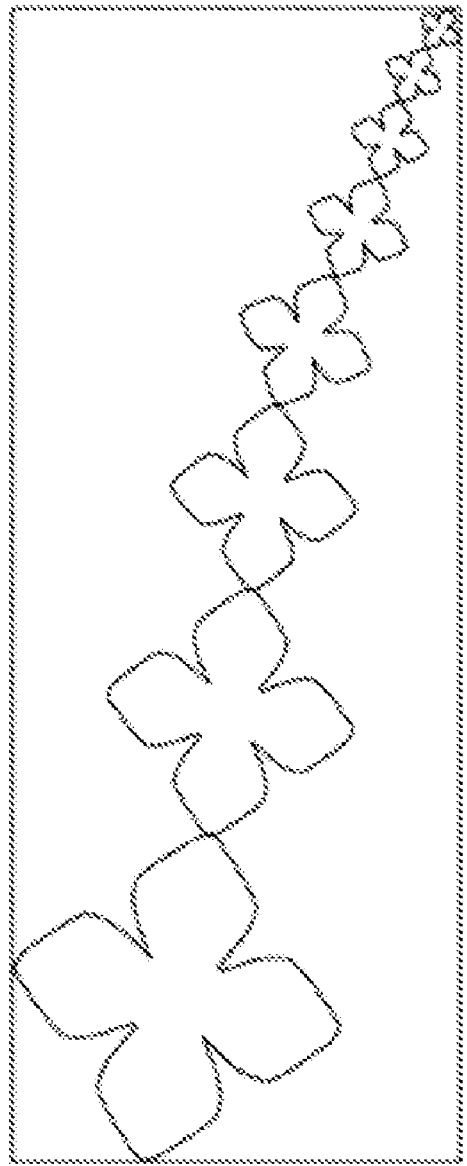
FIGS. 9A-B illustrate elements scaled along a path, according to some embodiments.
Figure 9B:
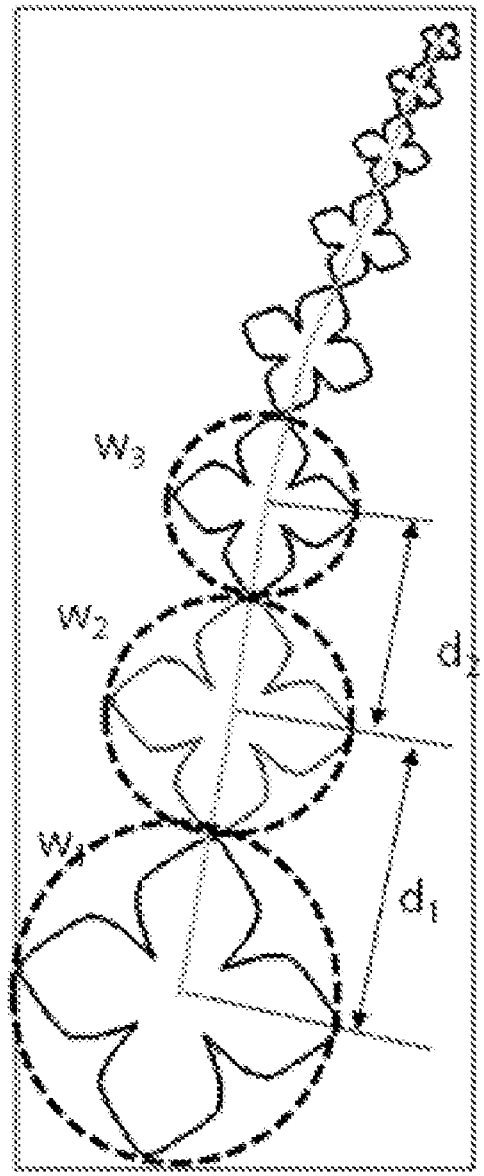
Figure 10A:
FIGS. 10A-E illustrate merging symmetry paths with elements having constant distance into a single path, according to some embodiments.
Figure 10B:
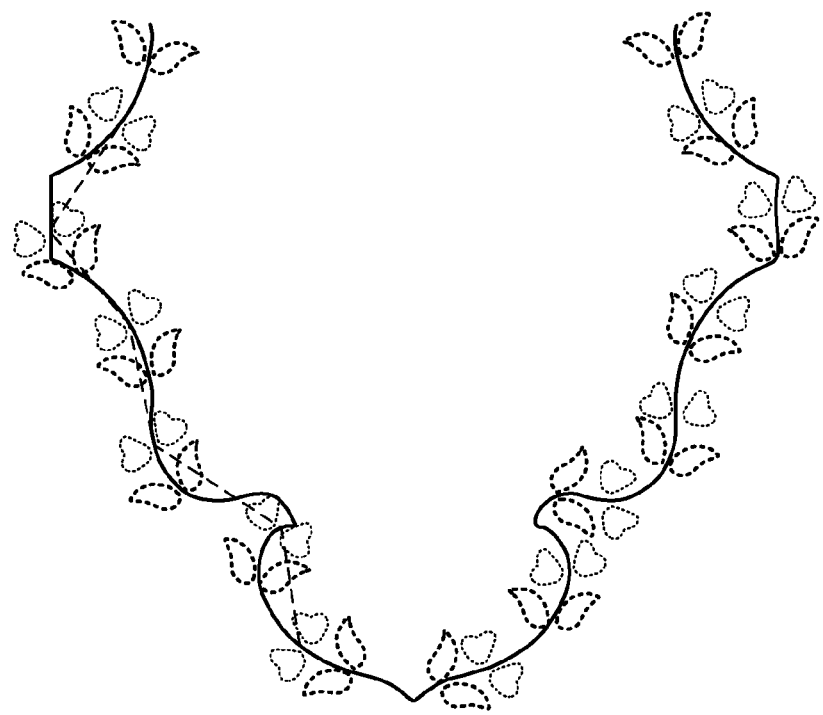
Figure 10C:
Figure 10D:
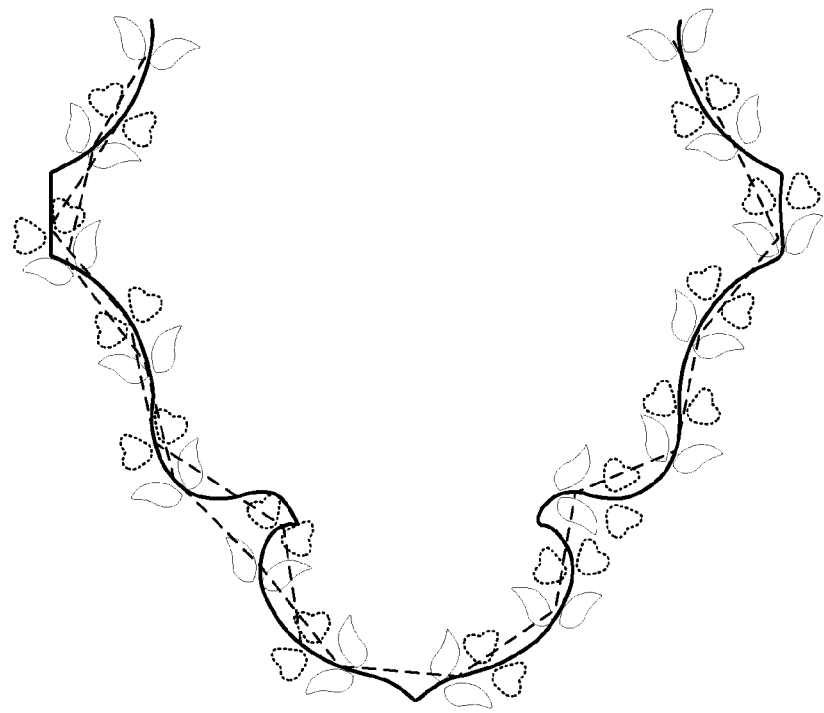
Figure 10E:
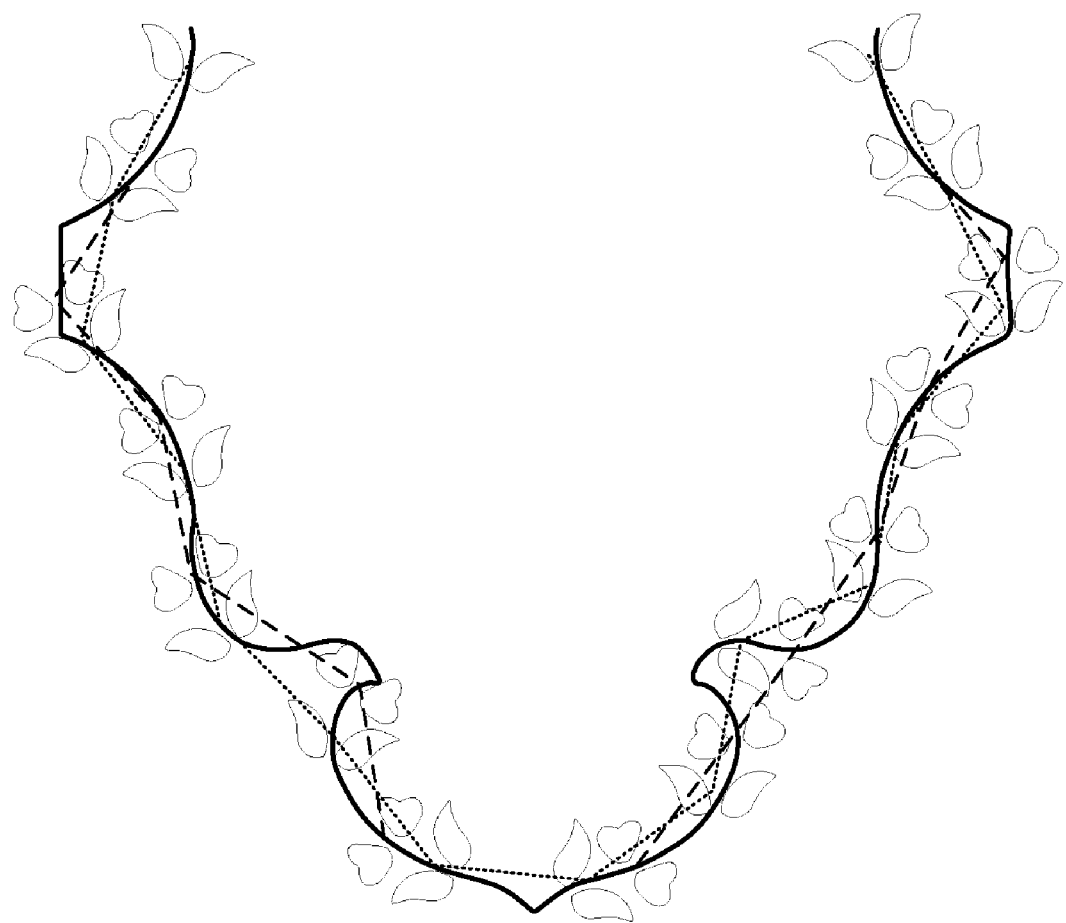

In a second case, the method may assume that the distance between elements or phantom objects for two consecutive pairs of elements or phantom objects may be scaled by the factor s as well, as illustrated in FIGS. 9A-B. To detect such symmetries, the method may operate to construct an additional one-dimensional transformation space, in which points may be stored at a location d=w, where d may be the distance between a pair of elements or phantom objects and w may be the size of the first element in the respective pair of elements or phantom objects. The method may add two points for each pair since the elements or phantom objects may be processed out of order. After clustering in this space, the method may detect sequences of elements and phantom object that are scaled along a path.

FIGS. 10A-E—Merging Lists Corresponding to the Same Path

FIG. 10 shows an example of multiple types of elements being arranged along the same symmetry path. In some embodiments, the method may group all types of elements along the same path together (e.g., into a same group). In some embodiments, the method may classify the different types of elements as different groups. Thus FIGS. 10A-E show an example of merging individually detected symmetry paths (b, c, d) with elements having constant distance into a single path (e).

Thus in a first case, the method may merge lists of elements that have approximately the same underlying paths. Because the paths are extracted by manifold learning on different point sets in the transformation space, the method may define a similarity measure between every two extracted paths, P and Q.

$$E=\Sigma(|p_i,q_j|-|p_{i+1},q_{j+1}|)^2 \quad (5)$$

where points $p_j$ may be on the path P and points $q_j$ may be on the path Q. In other words, if the distances between elements or phantom objects in consecutive pairs are similar, the two paths may be merged together. However, in some instances, the method may not merge lists of elements that have approximately the same underlying paths.

FIGS. 11A-D—Inverse Warping of Space Around Detected Paths

Once symmetry paths are detected, the method may further un-warp the space around these paths to extract more embedded symmetries. In some embodiments, the method may to straighten any curved paths (such as by using Floyd-Warshall algorithm). The method may then compute a geodesic distance from any point on the path to the head of the path as the x coordinate in the un-warped space. In some embodiments, only objects within a certain distance of the symmetry path may be un-warped.

Figure 11C:
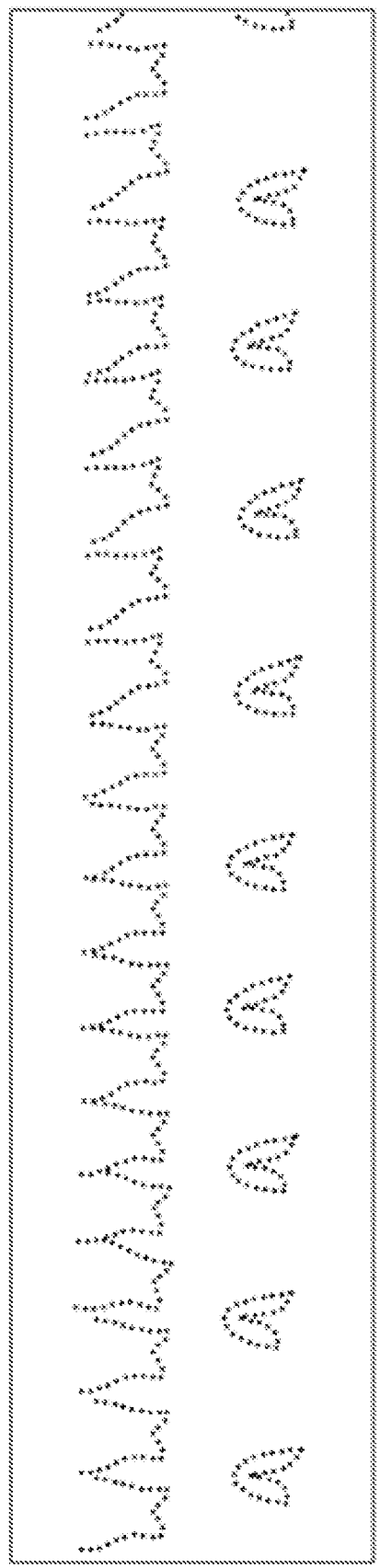
Figure 11D:
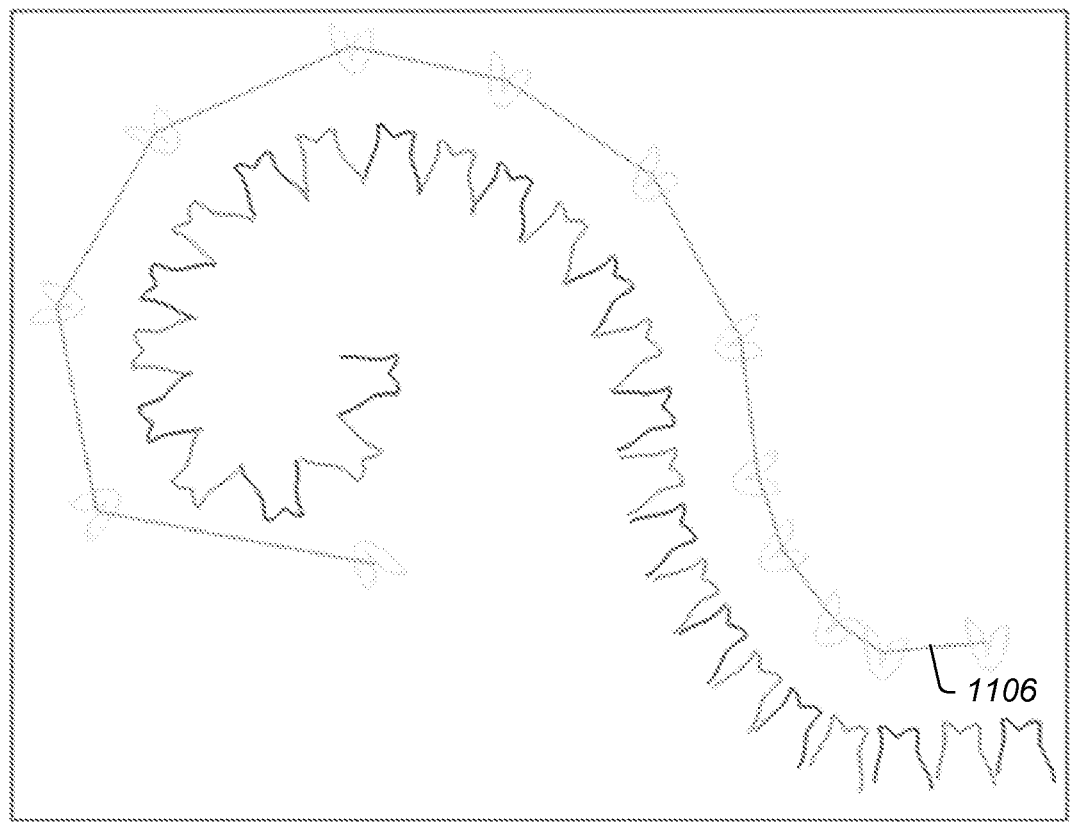

FIGS. 11A-D illustrate examples of a pattern and its unwarped version, where after straightening the path, the method was able to detect more symmetries. Specifically, without un-warping of a scene in image of FIG. 11A, the method may only detect one symmetry path 1102 (FIG. 11B). After the sample points are unwarped along the path (FIG. 11C) the method may detect the additional symmetry path 1106 (FIG. 11D). Furthermore, FIGS. 12A-C illustrate several reflection symmetries and translation along a path detected in a more complex pattern than one shown in FIGS. 11A-D.

FIGS. 13A-I—Pattern Editing and Applications

Figures 13A, 13B, 13C:
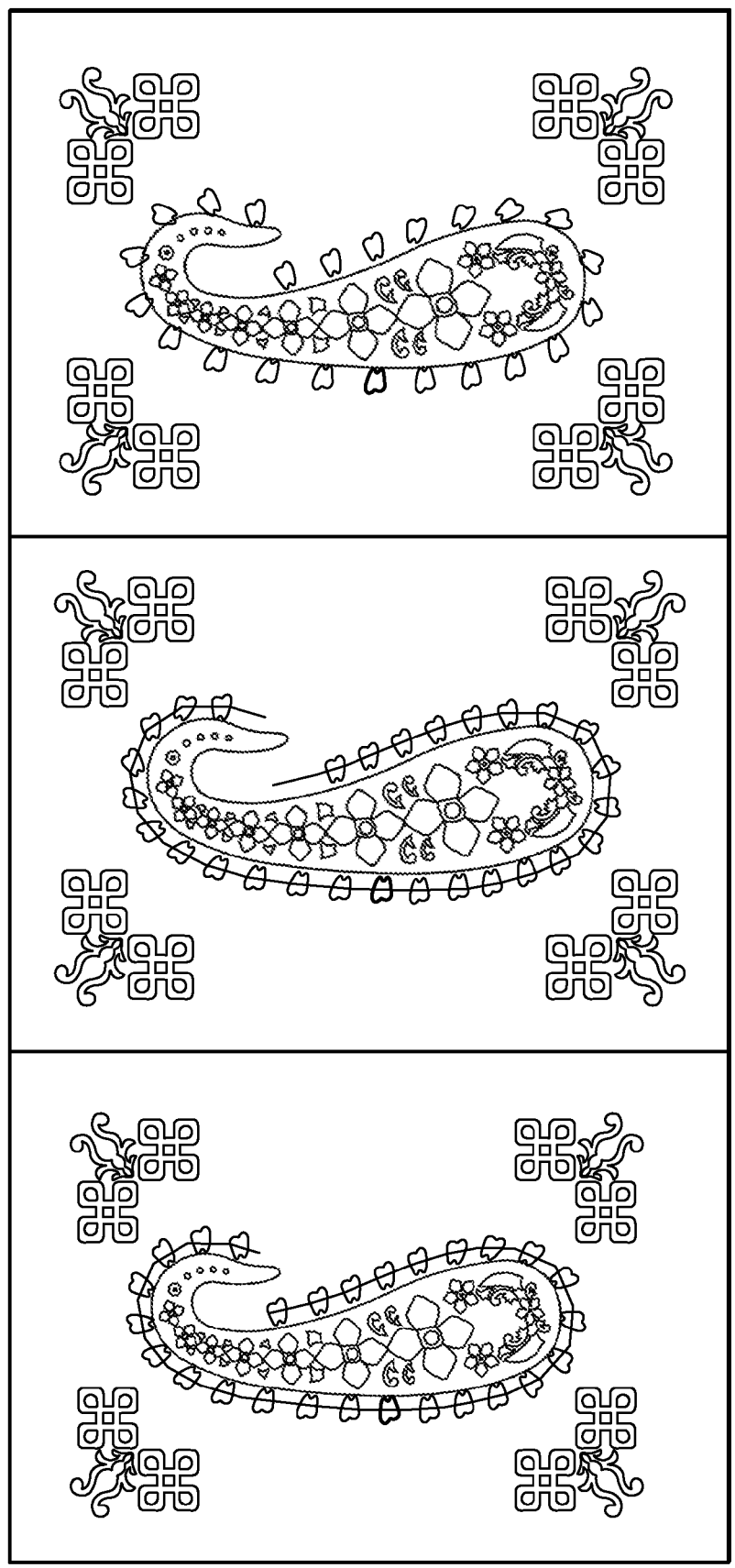
FIGS. 13A-I illustrate various applications of detected symmetries such as changing spacing of elements and moving elements along detected symmetry path, according to some embodiments.
Figures 13D, 13E, 13F:
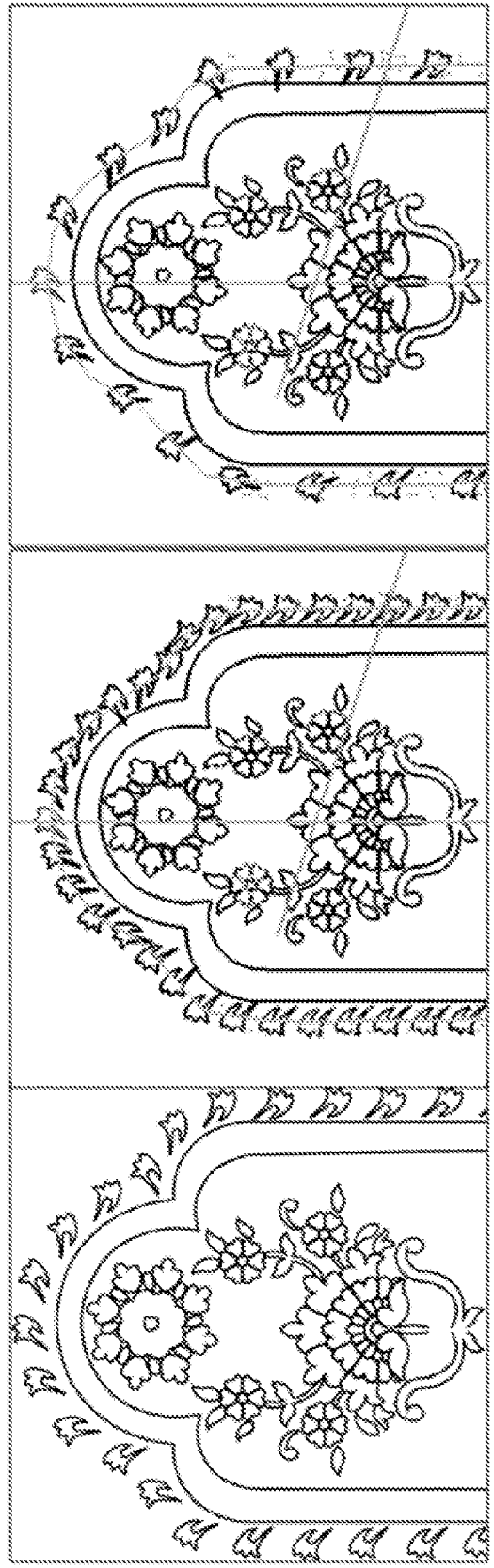
Figure 13I:
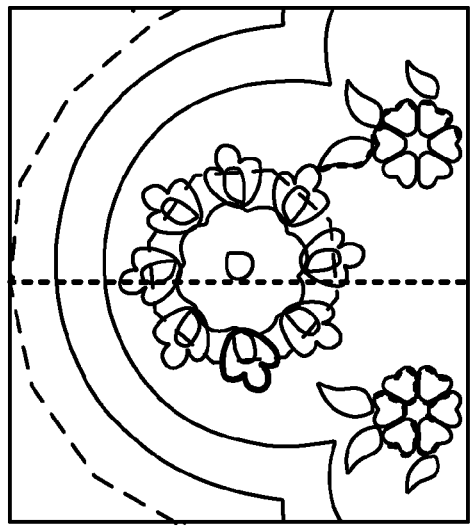
Figure 13H:
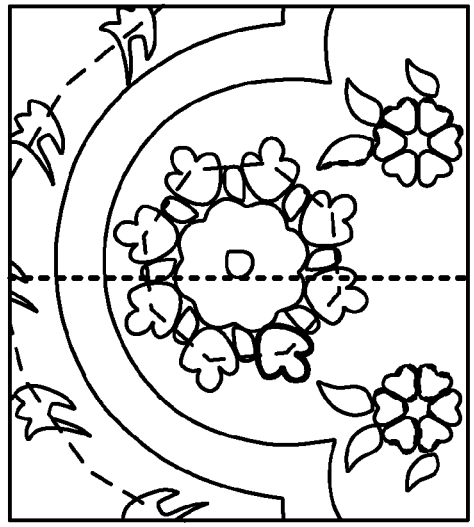
Figure 13G:
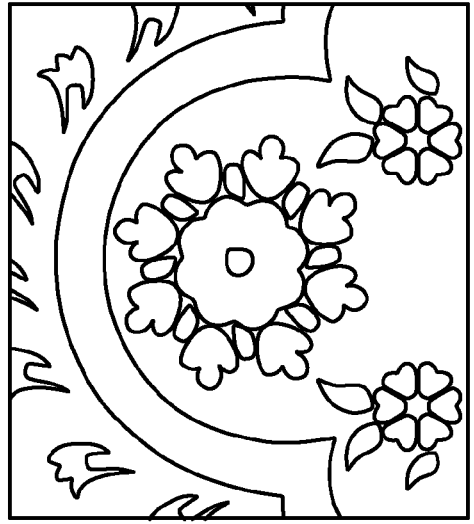

There may be various applications of pattern editing using results obtained from the symmetry detection method described herein, as shown in FIGS. 13A-I. For example, FIG. 13A shows an input reference pattern which contains elements arranged along a curved path. The method may detect whether there are symmetries corresponding to a user selected point in the pattern of FIG. 13B. A set of possible operations may be created according to the results of symmetry detection of FIG. 13C. In this pattern shown, for example, the user can slide elements along their underlying symmetry path as a group of FIG. 13 (c), scale the distance between elements of FIG. 13E, or they can even add additional mirror symmetries along the path of FIG. 13F. In other words, FIGS. 13A-F show several input reference patterns, which contain elements arranged along curved paths. The method may operate to detect whether there are symmetries corresponding to the user selected point in the pattern. A set of possible operations may be offered. For example, the user can slide elements along the detected symmetry path as a group and/or scale the distance between elements.

Additional examples of applications are shown with reference to FIGS. 1A-E. Thus the user may be able to edit one of the elements in a figure, and as a result apply the changes to all of the other elements that are found to be symmetric. The user may be able to move the elements around the image as a group. The user may be able to change the spacing between the elements without changing the scale of each. In addition, storage of such images may be made more efficient due to the recognized symmetry, i.e., the storage algorithm may only need to remember one element and various symmetry and transformation relationships in the image.

Thus the method may operate to detect symmetries in vector art, including symmetries that are warped along curved paths. The method may detect one or more of the following symmetries: translations, rotations, mirror reflections, scaling, and/or application of translations and mirror reflections along curved paths. The method may be integrated in a design tool, and as such, the detected symmetries can aid artists to perform various pattern editing tasks, as described above.

Computing System

Figure 14:
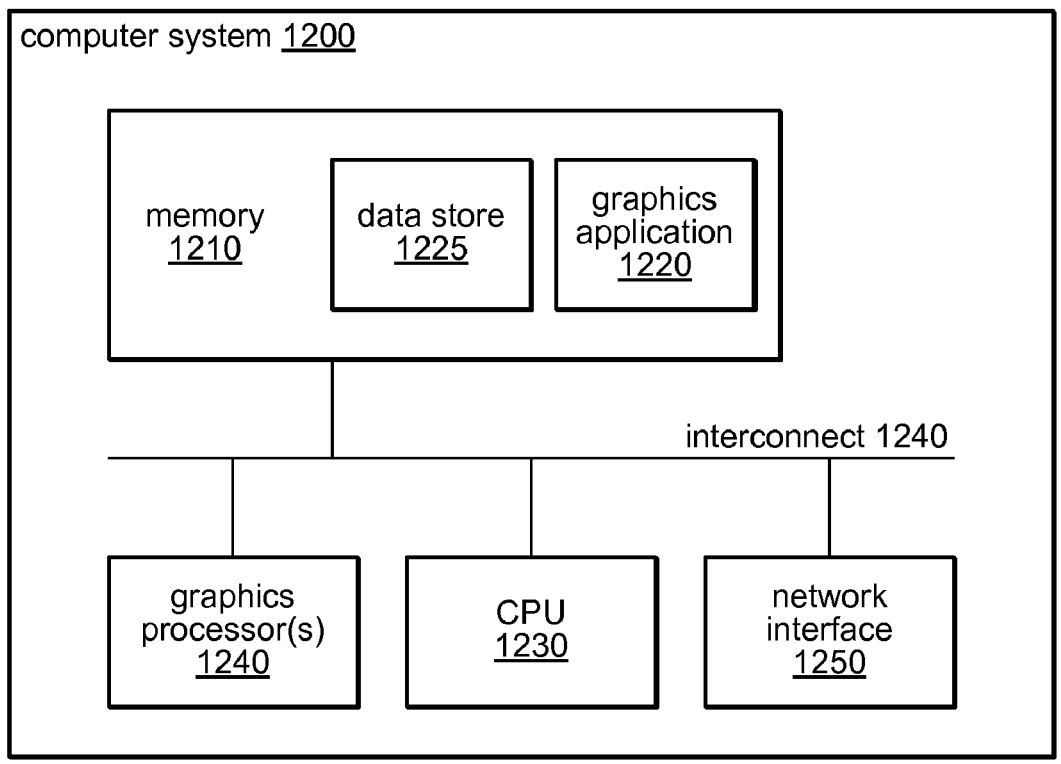
FIG. 14 illustrates a computer system that may be used in some embodiments.

The methods described herein for detecting symmetries along curved paths in vector art may be implemented, for example as software module, by a computer system configured to provide the functionality described. FIG. 14 is a block diagram illustrating one embodiment of a computer system 1200 suitable for implementing embodiments of the symmetry detection method. A graphics application such as graphics application 1220 may be configured to perform various image processing functions and to render new images accordingly. In some embodiments, a user may invoke operations to perform various functions as described for embodiments via a user interface of graphics application 1220. Graphics application 1220 may be configured to perform these operations using the methods described herein for detecting symmetries along curved paths in vector art. Graphics application 1220 may, for example, be configured to render an output image as a result of using embodiments of the method for detecting symmetries along curved paths in vector art.

Graphics application 1220 may represent various types of graphics applications, such as painting, publishing, photography, games, animation, and other applications. Additionally, graphics application 1220 may utilize a graphics processor 1240 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1240 may implement a number of graphics primitive operations in a way that makes executing them much faster than drawing directly to the screen with a host central processing unit (CPU), such as CPU 1230. In various embodiments, the methods disclosed herein for may be implemented by program instructions configured for parallel execution on two or more such GPUs. The GPU 1200 may implement one or more application programmer interfaces (APIs) that permit programmers to invoke the functionality of the GPU. Suitable GPUs may be commercially available from vendors such as NVIDIA Corporation, ATI Technologies, and others.

Please note that functionality and/or features described herein as being part of, or performed by, graphics application 1220 may, in some embodiments, be part of, or performed by, one or more graphics processors, such as graphics processor 1240. As described above, in some embodiments graphics application 1220 may be configured to render modified and/or reconstructed images into a different window than input images.

The various functions described herein for embodiments of a method and a system for detecting symmetries along curved paths in vector art may be implemented on various types of computer systems. Referring again to FIG. 14, computer system 1200 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 1220, which may be configured to implement the method for detecting symmetries along curved paths in vector art as described herein, may be provided as a computer program product, or software, that may include a computer-readable storage medium having stored thereon instructions, which may be used to program a computer system (or other electronic devices) to implement computer graphics functions such as rendering synthetic images using the techniques described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 14, computer system 1200 may include one or more processor units (CPUs) 1230. Processors 1230 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 1200, such as various versions of Unix, Linux, Windows™ from Microsoft Corporation, MacOS™ from Apple Corporation, or any other operating system that enables the operation of software on a hardware platform.

The computer system 1200 may also include one or more system memories 1210 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 1200 via interconnect 1260. Memory 1210 may include other types of memory as well, or combinations thereof. One or more of memories 1210 may include program instructions 1215 executable by one or more of processors 1230 to implement a method for detecting symmetries along curved paths in vector art as described herein. Program instructions 1215, which may include program instructions configured to implement graphics application 1220, may be partly or fully resident within the memory 1210 of computer system 1200 at any point in time. Alternatively, program instructions 1215 may be provided to GPU 1240 for performing various computer graphics operations (or portions thereof) on GPU 1240 using one or more of the techniques described herein. In some embodiments, the techniques described herein may be implemented by a combination of program instructions 1215 executed on one or more processors 1230 and one or more GPUs 1240, respectively.

Program instructions 1215 may also be stored on an external storage device (not shown) accessible by the processor(s) 1230 and/or GPU 1240, in some embodiments. Any of a variety of such storage devices may be used to store the program instructions 1215 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 1230 and/or GPU 1240 through one or more storage or I/O interfaces including, but not limited to, interconnect 1260 or network interface 1250, as described herein. In some embodiments, the program instructions 1215 may be provided to the computer system 1200 via any suitable computer-readable storage medium including memory 1210 and/or external storage devices described above. Memory 1210 may also be configured to implement one or more data structures 1225, such as one or more data structures used by a method for detecting symmetries along curved paths in vector art. Data structures 1225 may be accessible by processor(s) 1230 and/or GPU 1240 when executing graphics application 1220 or other program instructions 1215.

As shown in FIG. 14, processor(s) 1230 may be coupled to one or more of the other illustrated components by at least one communications bus, such as interconnect 1260 (e.g., a system bus, LDT, PCI, ISA, or other communication bus type), and a network interface 1250 (e.g., an ATM interface, an Ethernet interface, a Frame Relay interface, or other interface). The CPU 1230, the network interface 1250, and the memory 1210 may be coupled to the interconnect 1260. It should also be noted that one or more components of system 1200 might be located remotely and accessed via a network.

As noted above, in some embodiments, memory 1210 may include program instructions 1215, comprising program instructions configured to implement graphics application 1220, as described herein. Graphics application 1220 may be implemented in various embodiments using any desired programming language, scripting language, or combination of programming languages and/or scripting languages, e.g., C, C++, C#, Java™, Perl, etc. For example, in one embodiment, graphics application 1220 may be JAVA based, while in another embodiments, it may be implemented using the C or C++ programming languages. In other embodiments, graphics application 1220 may be implemented using specific graphic languages specifically for developing programs executed by specialize graphics hardware, such as GPU 1240. In addition, graphics application 1220 may be embodied on memory specifically allocated for use by graphics processor(s) 1240, such as memory on a graphics board including graphics processor(s) 1240. Thus, memory 1210 may represent dedicated graphics memory as well as general-purpose system RAM, in various embodiments. Memory 1210 may in some embodiments also include a data store configured to store image data for one or more input images or other graphics information and/or output images, or other information for use in computer graphics such as environment maps and reflectance functions, in various embodiments. Other information not described herein may be included in memory 1210 and may be used to implement the methods described herein and/or other functionality of computer system 1200.

Network interface 1250 may be configured to enable computer system 1200 to communicate with other computers, systems or machines, such as across a network. Network interface 1250 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 1200 is interconnected may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 1250 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1240 may be implemented in a number of different physical forms. For example, GPU 1240 may take the form of a dedicated graphics card, an integrated graphics solution and/or a hybrid solution. GPU 1240 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 14, memory 1210 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 1240 and the rest of the computer system 1200 may travel through a graphics card slot or other interface, such as interconnect 1260 of FIG. 14.

Computer system 1200 may also include one or more additional I/O interfaces, such as interfaces for one or more user input devices 1270, or such devices may be coupled to computer system 1200 via network interface 1250. For example, computer system 1200 may include interfaces to a keyboard, a mouse or other cursor control device, a joystick, or other user input devices 1270, in various embodiments. Additionally, the computer system 1200 may include one or more displays (not shown), coupled to processors 1230 and/or other components via interconnect 1260 or network interface 1250. Such input/output devices may be configured to allow a user to interact with graphics application 1220 to request or invoke various computer graphics operations and/or to specify various parameters, thresholds, and/or other configurable options available to the user when performing computer graphics tasks while executing graphic application 1220. It will be apparent to those having ordinary skill in the art that computer system 1200 may also include numerous other elements not shown in FIG. 14.

Note that program instructions 1215 may be configured to implement a graphic application 1220 as a stand-alone application, or as a module of another graphics application or graphics library, in various embodiments. For example, in one embodiment program instructions 1215 may be configured to implement graphics applications such as painting, publishing, photography, games, animation, and/or other applications, and may be configured to render and/or edit synthetic images as part of one or more of these graphics applications. In another embodiment, program instructions 1215 may be configured to implement the techniques of various embodiments as described herein in one or more functions called by another graphics application executed on GPU 1240 and/or processor(s) 1230. Program instructions 1215 may also be configured to render images and present them on one or more displays as the output of an computer graphics operation and/or to store image data for synthesized, modified and/or reconstructed images in memory 1210 and/or an external storage device(s), in various embodiments. For example, a graphics application 1220 included in program instructions 1215 may utilize GPU 1240 when modifying, rendering, or displaying images in some embodiments.

Those skilled in the art will appreciate that computer system 1200 is merely illustrative and is not intended to limit the scope of a method and apparatus for importance sampling spherical harmonics as described herein. In particular, the computer system and devices may include any combination of hardware or software that can perform the indicated functions, including computers, network devices, internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent various embodiments of methods for detecting symmetries along paths in vector art. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   receiving an image, wherein the image comprises a first scene, wherein the first scene comprises one or more objects distributed on one or more curves, wherein the one or more objects are arranged according to one or more symmetries;
   placing a plurality of sample points for the one or more objects at uniform distances along each of the one or more curves in the first scene;
   matching transformations in transformation space for pairs of the plurality of the sample points, wherein one or more of the pairs of the plurality of sample points comprise a respective matching neighborhood; and
   placing one or more points in the transformation space for each of the one or more pairs with the matching neighborhood to find the one or more symmetries.

2. The method of claim 1, further comprising:
   detecting a plurality of elements by finding the respective one or more matching neighborhoods of the sample point pairs with matching transformations.

3. The method of claim 2, further comprising:
   defining a first centroid for a first element of the plurality of elements and a second centroid for a second element of the plurality of elements, wherein the first centroid and the second centroid comprise a first centroid pair;
   finding one or more transformations between the centroids of the first centroid pair.

4. The method of claim 3, further comprising:
   examining the first centroid pair;
   placing points in the transformation space dependent on the first centroid pair; and
   clustering in the transformation space to obtain symmetries along the one or more curves according to the placed points.

5. The method of claim 4, wherein said placing points in the transformation space comprises:
   creating phantom objects for the first centroid pair that exhibit a mirror symmetry; and
   placing points in the transformation space for a first pair of phantom objects.

6. The method of claim 4, further comprising:
   receiving input indicative of sliding a group of elements along the one or more curves; and
   in response to said receiving, sliding the group of elements along the one or more curves.

7. The method of claim 4, further comprising:
   determining that distances between elements in consecutive pairs on the two or more curves are constant; and in response to said receiving, merging the one or more curves.

8. The method of claim 4, further comprising:
receiving input indicative of changing spacing between at least some of the plurality of elements along a respective one of the one or more curves; and
in response to said receiving, changing the spacing between the at least some of the plurality of elements along the respective one of the one or more curves.

9. The method of claim 4, further comprising:
locally straightening a geometry of the first scene around the one or more curves.

10. The method of claim 1, further comprising:
storing the image using one of the found one or more symmetries.

11. The method of claim 1,
wherein the one or more symmetries comprise one or more of:
reflection symmetry;
translation symmetry;
scaling symmetry; or
any other type of symmetry.

12. A system, comprising:
one or more processors; and
a memory coupled to the one or more processors, wherein the memory stores program instructions executable by the one or more processors to implement:
receiving an image, wherein the image comprises a first scene, wherein the first scene comprises one or more objects distributed on one or more curves, wherein the one or more objects are arranged according to one or more symmetries;
placing a plurality of sample points for the one or more objects at uniform distances along each of the one or more curves in the first scene;
matching transformations in transformation space for pairs of the plurality of the sample points, wherein one or more of the pairs of the plurality of the sample points comprise a respective matching neighborhood; and
placing one or more points in the transformation space for each of the one or more pairs with the matching neighborhood to find the one or more symmetries.

13. The system of claim 12, wherein the program instructions are further executable by the one or more processors to implement:
detecting a plurality of elements by finding the respective one or more matching neighborhoods of the sample point pairs with matching transformations.

14. The system of claim 13, wherein the program instructions are further executable by the one or more processors to implement:
defining a first centroid for a first element of the plurality of elements and a second centroid for a second element of the plurality of elements, wherein the first centroid and the second centroid comprise a first centroid pair;
finding one or more transformations between the centroids of the first centroid pair.

15. The system of claim 14, wherein the program instructions are further executable by the one or more processors to implement:
examining the first centroid pair;
placing points in the transformation space dependent on the first centroid pair; and
clustering in the transformation space to obtain symmetries along the one or more curves according to the placed points.

16. The system of claim 15, wherein said placing points in the transformation space comprises:
creating one or more phantom objects for the first centroid pair that exhibit a mirror symmetry; and
placing points in the transformation space for a first pair of phantom objects.

17. The system of claim 15, wherein the program instructions are further executable by the one or more processors to implement:
receiving input indicative of sliding a group of elements along the one or more curves; and
in response to said receiving, sliding the group of elements along the one or more curves.

18. The system of claim 15, wherein the program instructions are further executable by the one or more processors to implement:
determining that distances between elements in consecutive pairs on the two or more curves are constant; and
in response to said determining, merging the one or more curves that.

19. The system of claim 15, wherein the program instructions are further executable by the one or more processors to implement:
receiving input indicative of changing spacing between at least some of the plurality of elements along a respective one of the one or more curves; and
in response to said receiving, changing the space between the at least some of the plurality of elements along the respective one of the one or more curves.

20. The system of claim 15, wherein the program instructions are further executable by the one or more processors to implement:
locally straightening a geometry of the first scene around the one or more curves.

21. The system of claim 12, wherein the program instructions are further executable by the one or more processors to implement:
storing the image using one of the one or more symmetries.

22. The system of claim 12,
wherein the one or more symmetries comprise one or more of:
reflection symmetry;
translation symmetry;
scaling symmetry; or
any other type of symmetry.

23. A computer-readable storage medium storing program instructions computer-executable to implement:
receiving an image, wherein the image comprises a first scene, wherein the first scene comprises one or more objects distributed on one or more curves, wherein the one or more objects are arranged according to one or more symmetries;
placing a plurality of sample points for the one or more objects at uniform distances along each of the one or more curves in the first scene;
matching transformations in transformation space for pairs of the plurality of the sample points, wherein one or more of the pairs of the plurality of the sample points comprise a respective matching neighborhood; and
placing one or more points in the transformation space for each of the one or more pairs with the matching neighborhood to find the one or more symmetries.

24. The computer-readable storage medium of claim 23, wherein the program instructions are further computer-executable to implement:

detecting a plurality of elements by finding the respective one or more matching neighborhoods of the sample point pairs with matching transformations.

25. The computer-readable storage medium of claim 24, wherein the program instructions are further computer-executable to implement:

defining a first centroid for a first element of the plurality of elements and a second centroid for a second element of the plurality of elements, wherein the first centroid and the second centroid comprise a first centroid pair;

finding one or more transformations between the centroids of the first centroid pair.

26. The computer-readable storage medium of claim 25, wherein the program instructions are further computer-executable to implement:

examining the first centroid pair;

placing points in the transformation space dependent on the first centroid pair; and clustering in the transformation space to obtain symmetries along the one or more curves according to the placed points.

27. The computer-readable storage medium of claim 26, wherein said placing points in the transformation space comprises:

creating one or more phantom objects for the first centroid pair that exhibit a mirror symmetry; and placing points in the transformation space for a first pair of phantom objects.

28. The computer-readable storage medium of claim 26, wherein the program instructions are further computer-executable to implement:

receiving input indicative of sliding a group of elements along the one or more curves; and in response to said receiving, sliding the group of elements along the one or more curves.

29. The computer-readable storage medium of claim 26, wherein the program instructions are further computer-executable to implement:

determining that distances between elements in consecutive pairs on the one or more curves are constant; and in response to said determining, merging the one or more curves.

30. The computer-readable storage medium of claim 26, wherein the program instructions are further computer-executable to implement:

receiving input indicative of changing spacing between at least some of the plurality of elements along a respective one of the one or more curves; and in response to said receiving, changing spacing of the at least some of the plurality of elements along the respective one of the one or more curves.

31. The computer-readable storage medium of claim 26, wherein the program instructions are further computer-executable to implement:

locally straightening a geometry of the first scene around the one or more curves.

32. The computer-readable storage medium of claim 23, wherein the program instructions are further computer-executable to implement:

storing the image using one of the one or more symmetries.

33. The computer-readable storage medium of claim 23, wherein the one or more symmetries comprise one or more of:

reflection symmetry;

translation symmetry;

scaling symmetry; or any other type of symmetry.

34. A computer-implemented method, comprising:

executing instructions on a specific apparatus so that binary digital electronic signals representing an image are received, wherein the image comprises a first scene, wherein the first scene comprises one or more objects distributed on one or more curves, wherein the one or more objects are arranged according to one or more symmetries;

executing instructions on said specific apparatus so that binary digital electronic signals representing a plurality of sample points are placed for the one or more objects at uniform distances along each of the one or more curves in the first scene;

executing instructions on said specific apparatus to match transformations in transformation space for pairs of the plurality of the sample points, wherein one or more of the pairs of the plurality of the sample points comprise a respective matching neighborhood; and executing instructions on said specific apparatus so that binary digital electronic signals representing one or more points in the transformation space are placed for each of the one or more pairs with the matching neighborhood to find the one or more symmetries.

* * * * *